Figure 8:
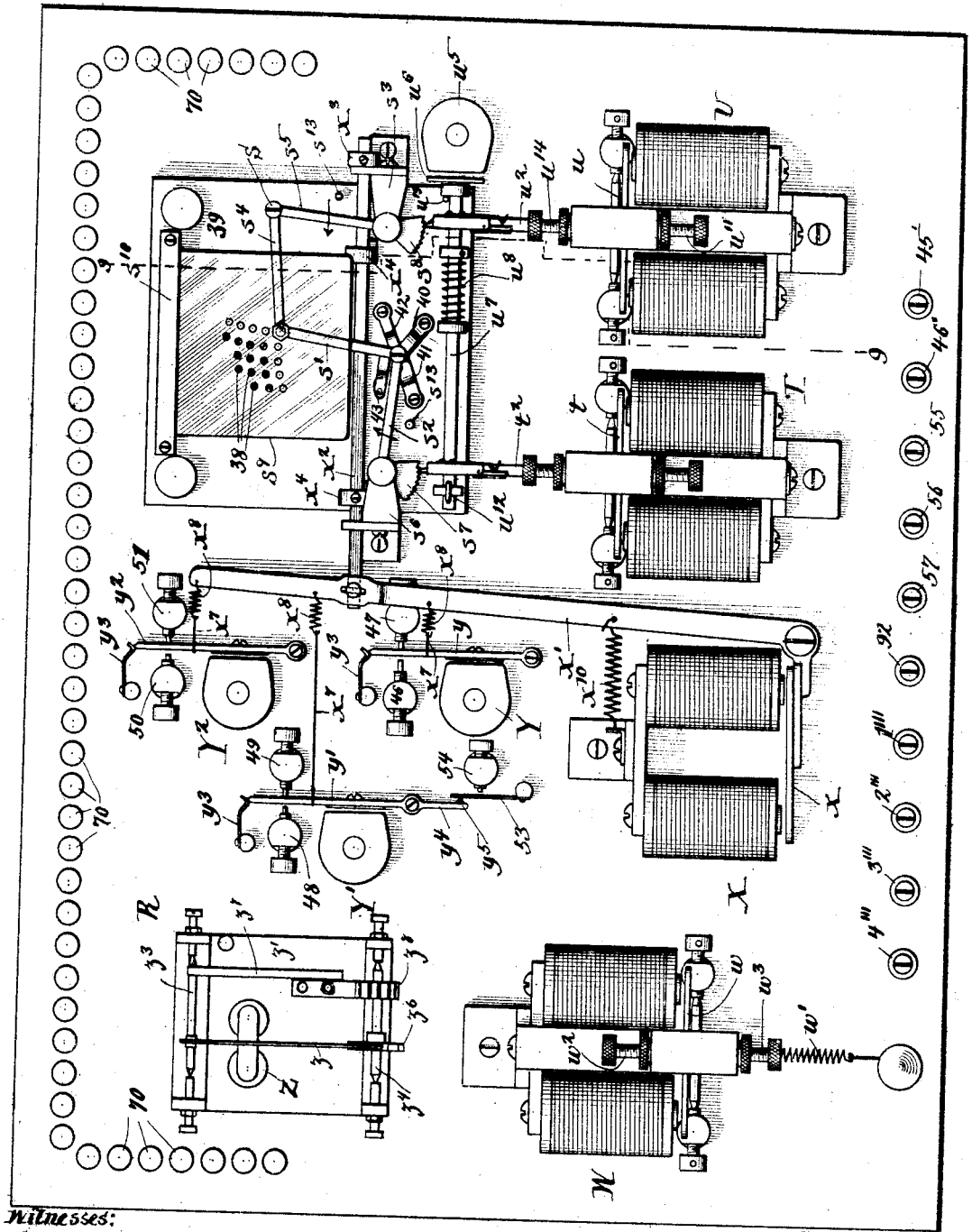

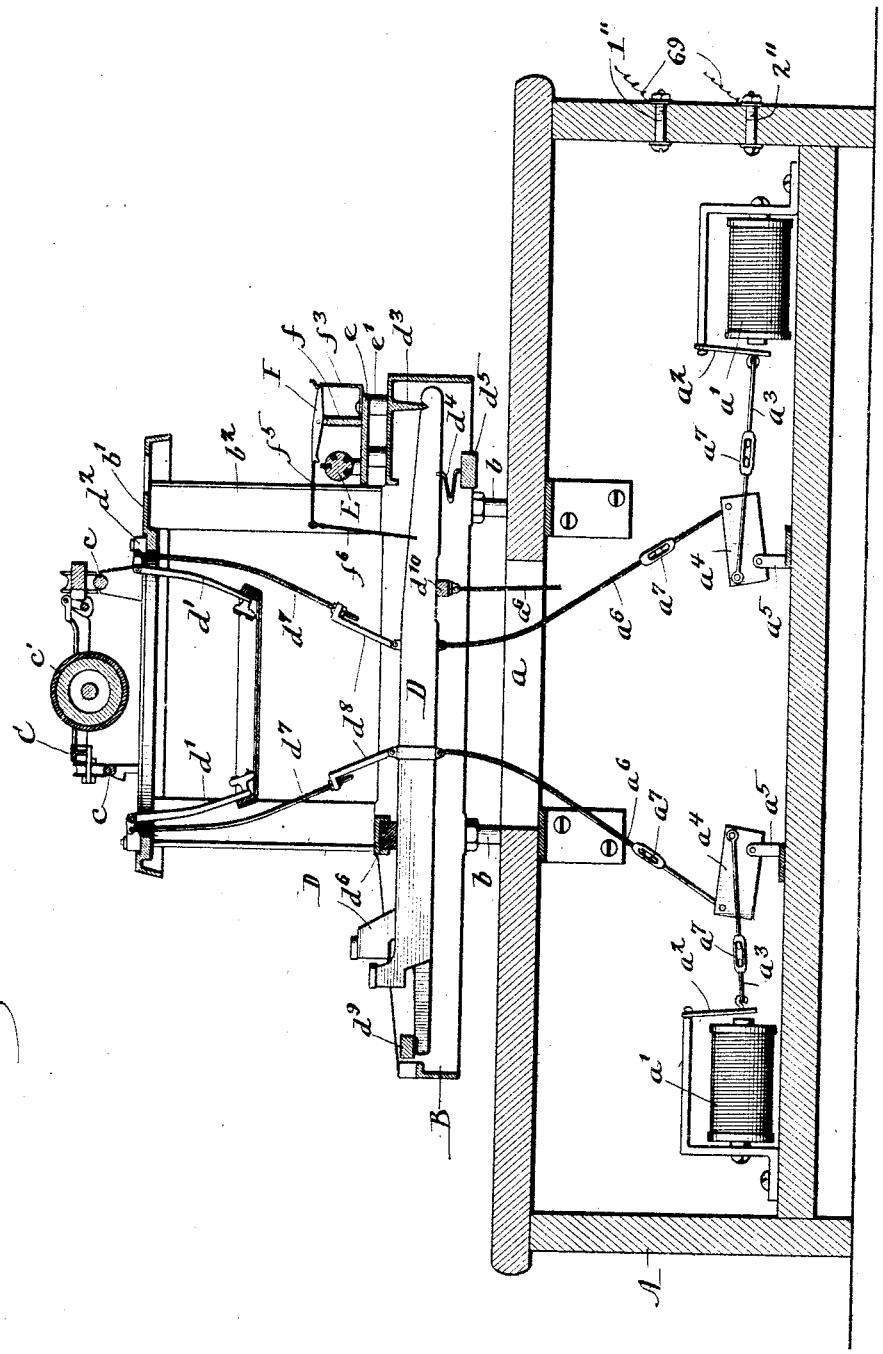

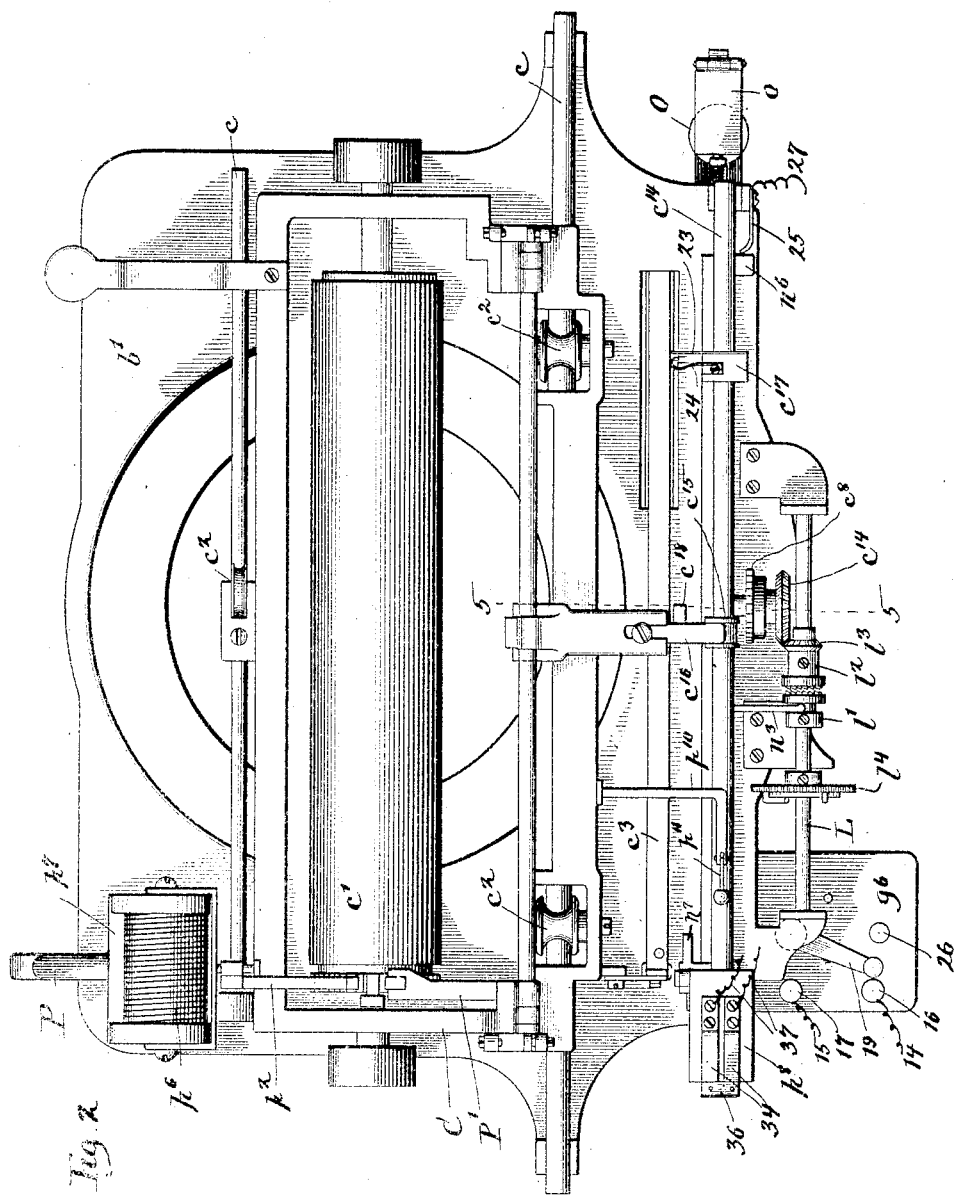

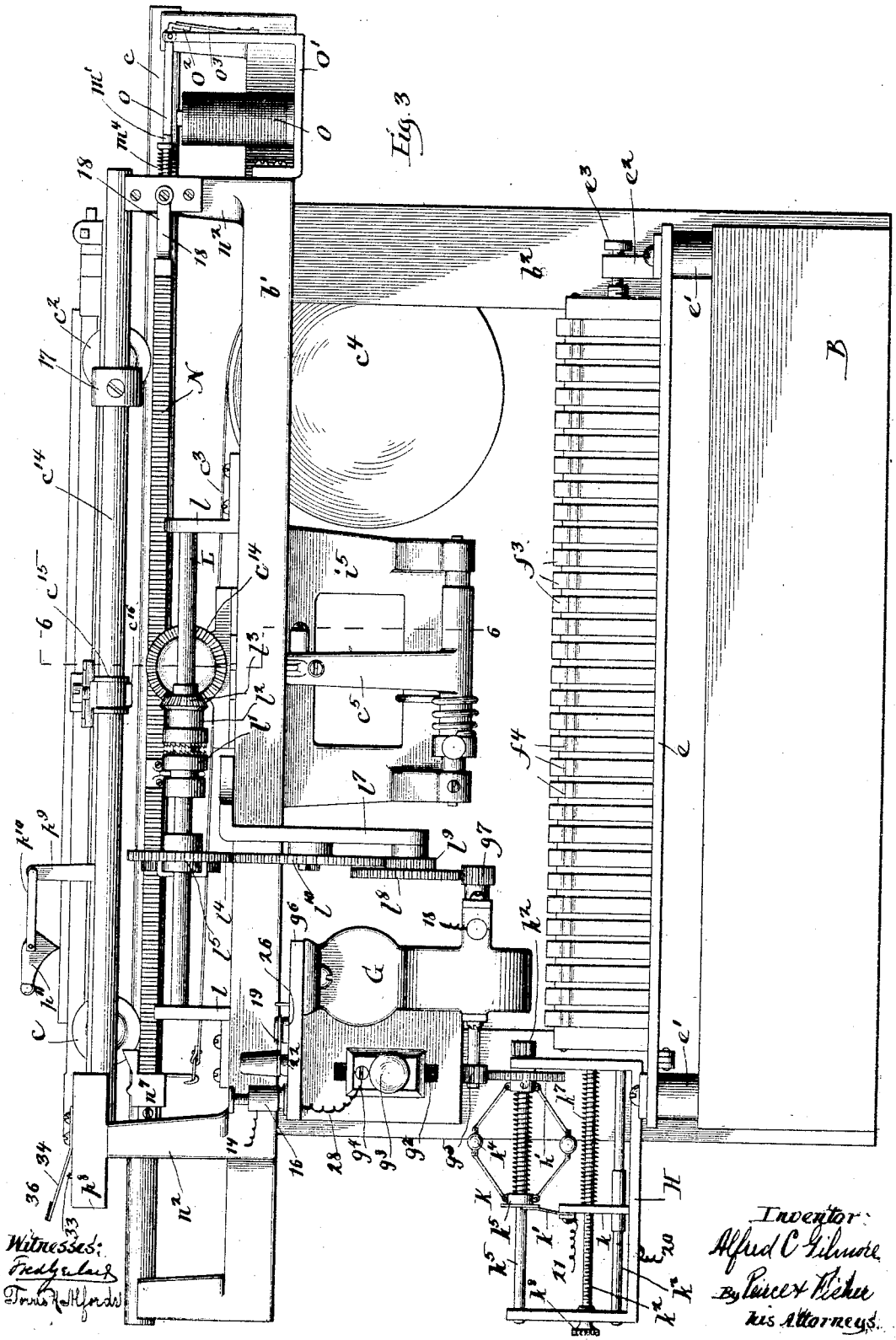

No. 695,203. Patented Mar. 11, 1902.
A. C. GILMORE.
AUTOMATIC TELEGRAPH.
(Application filed Apr. 22, 1901.)
(No Model.) 13 Sheets—Sheet 4.
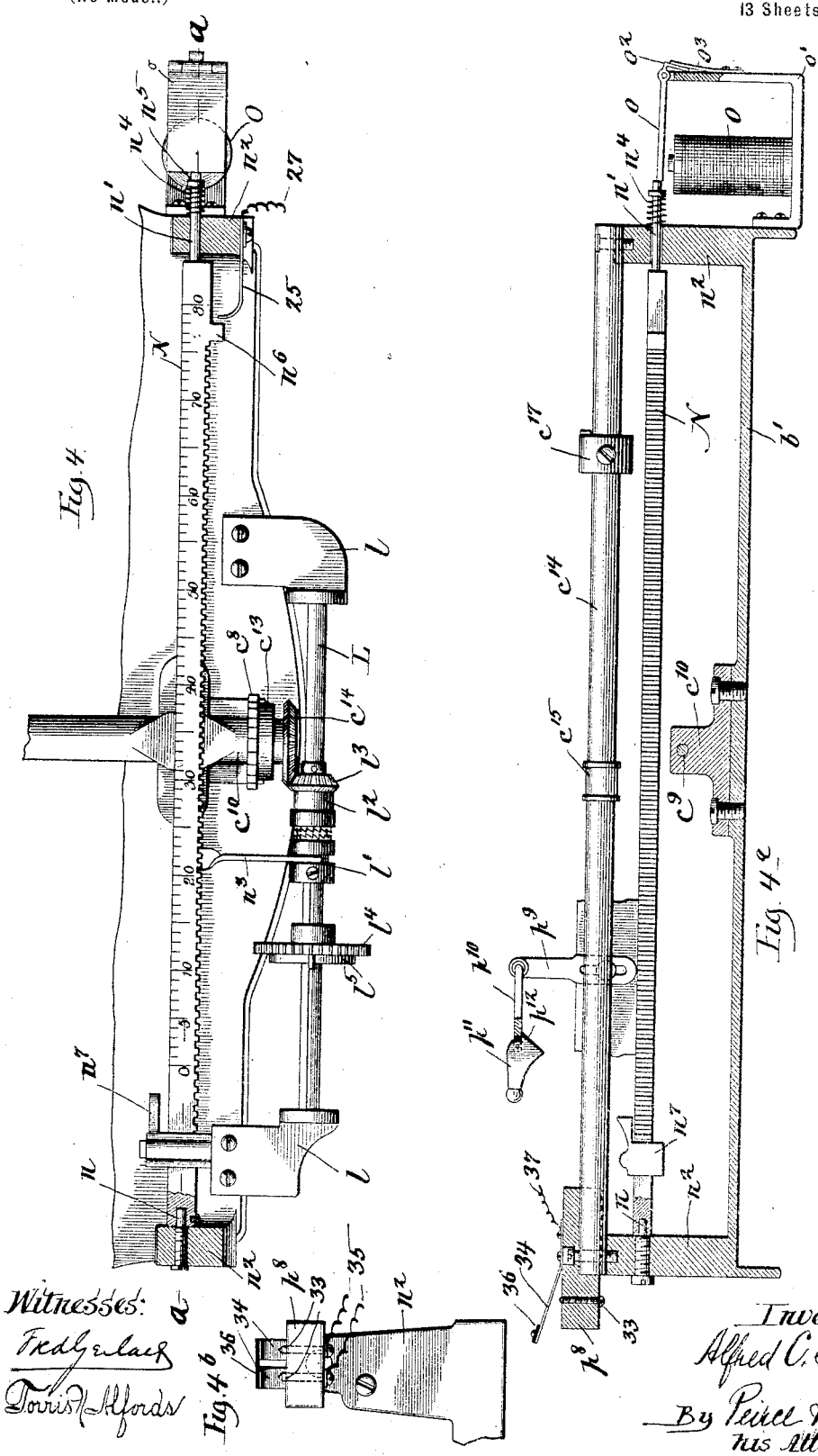
Witnesses: 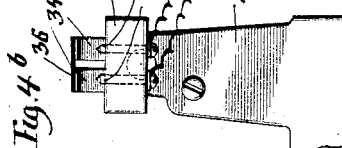
Inventor:
Alfred C. Gilmore
By Peirce & Fisher
his Attorneys No. 695,203. Patented Mar. 11, 1902.
A. C. GILMORE.
AUTOMATIC TELEGRAPH.
(Application filed Apr. 22, 1901.)
(No Model.) 13 Sheets—Sheet 5.
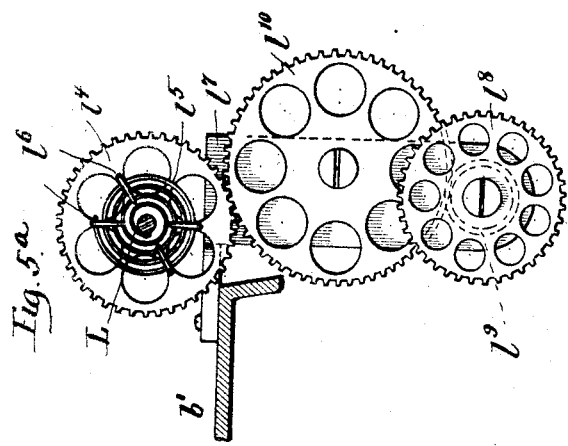
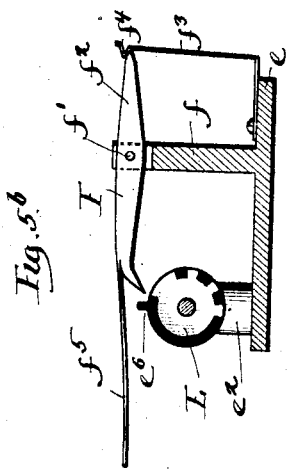
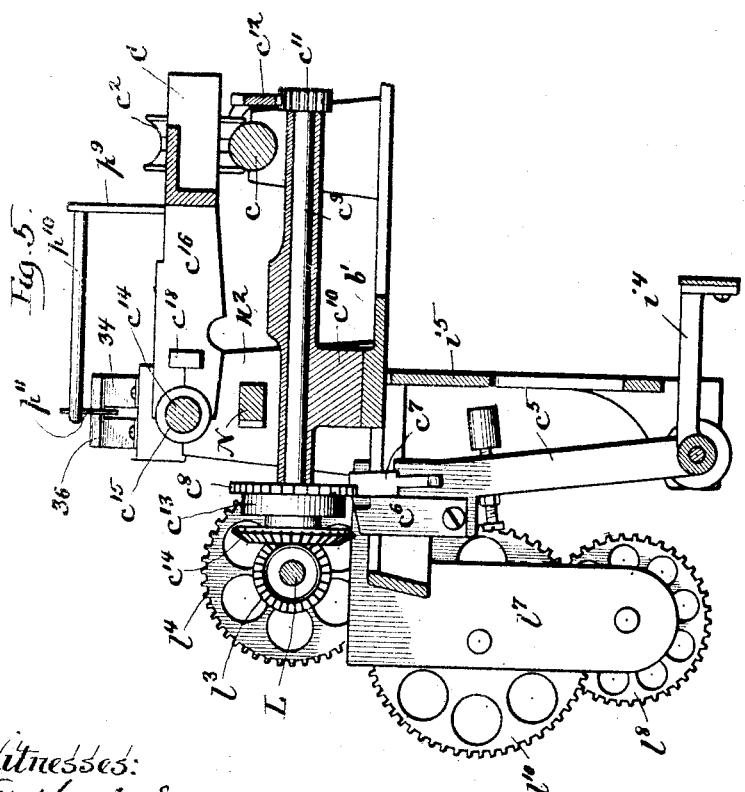
Witnesses:
Inventor:
Alfred C. Gilmore
By Peirce & Fisher,
his Attorneys.

No. 695,203. Patented Mar. 11, 1902.
A. C. GILMORE.
AUTOMATIC TELEGRAPH.
(Application filed Apr. 22, 1901.)
(No Model.) 13 Sheets—Sheet 6.
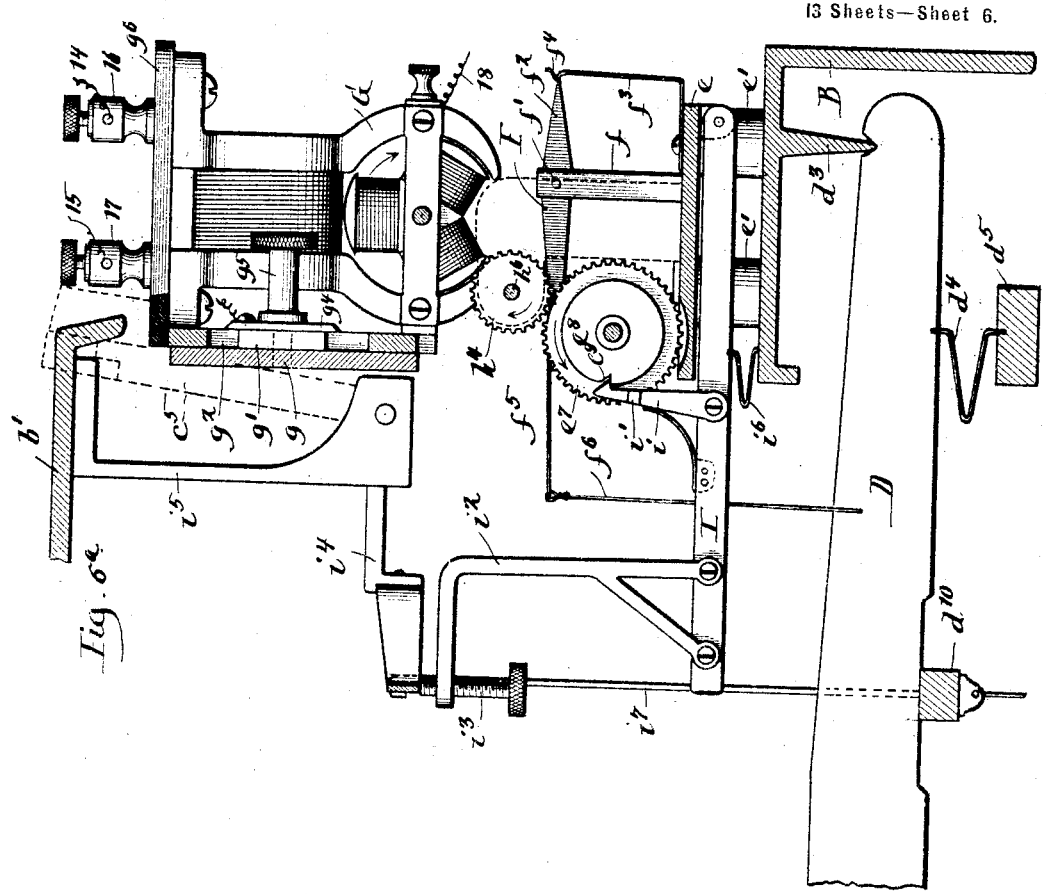
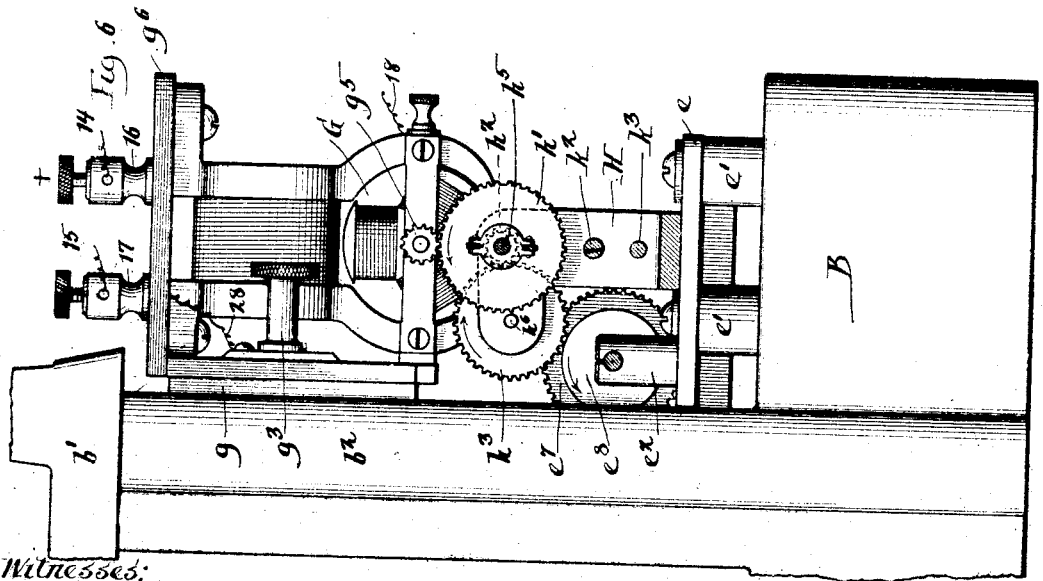

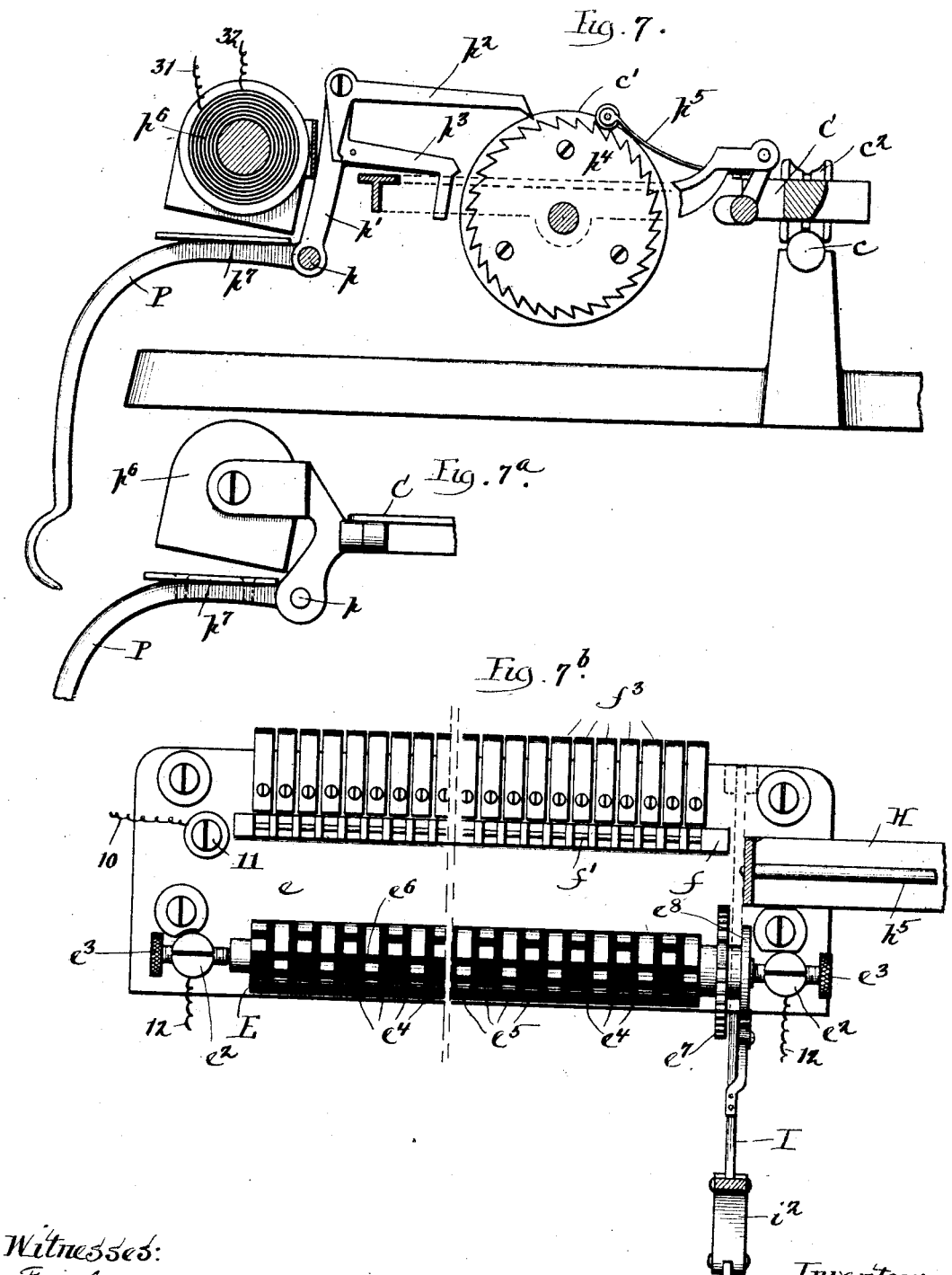

No. 695,203. Patented Mar. 11, 1902.
A. C. GILMORE.
AUTOMATIC TELEGRAPH.
(Application filed Apr. 22, 1901.)
(No Model.) 13 Sheets—Sheet 8.

Witnesses:
Inventor:
Alfred C. Gilmore
By Pierce & Fisher,
his Attorneys

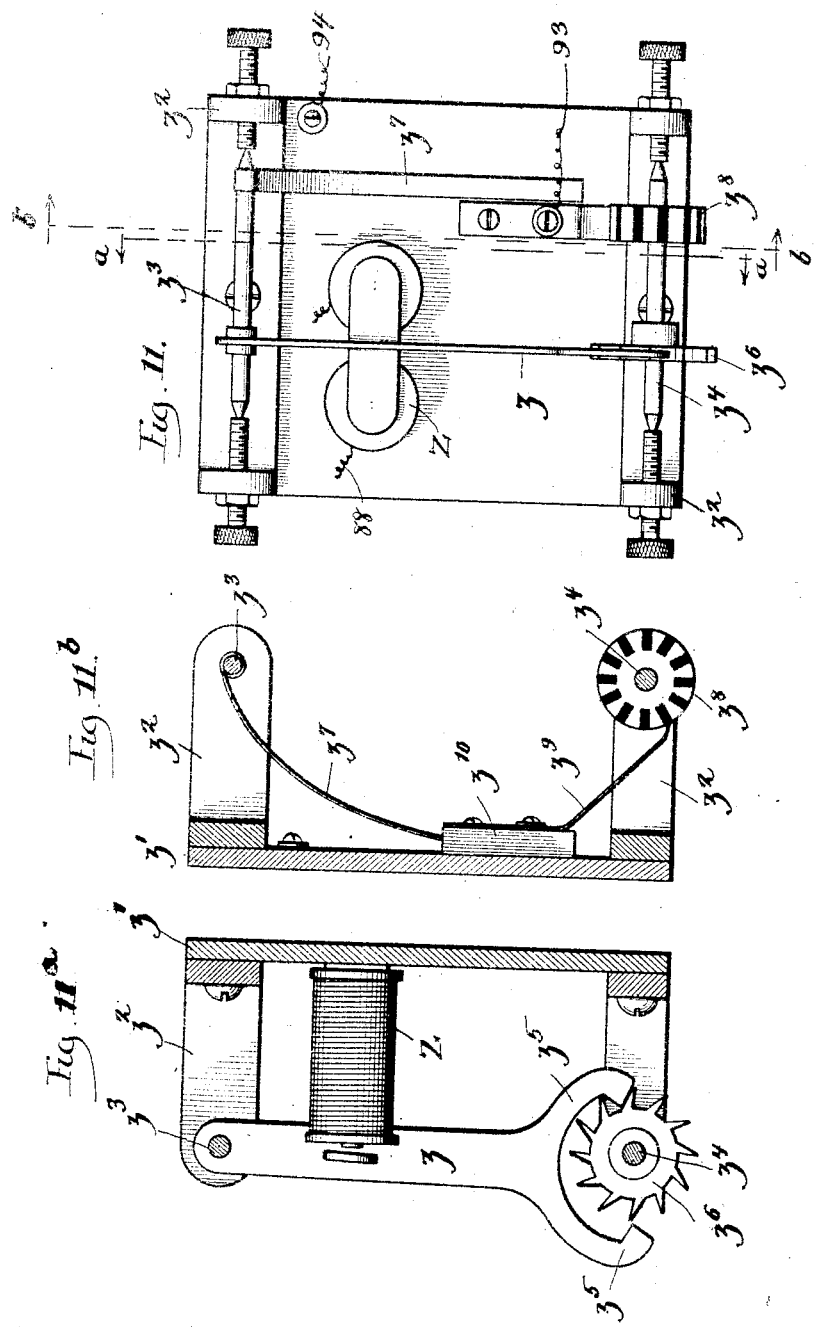

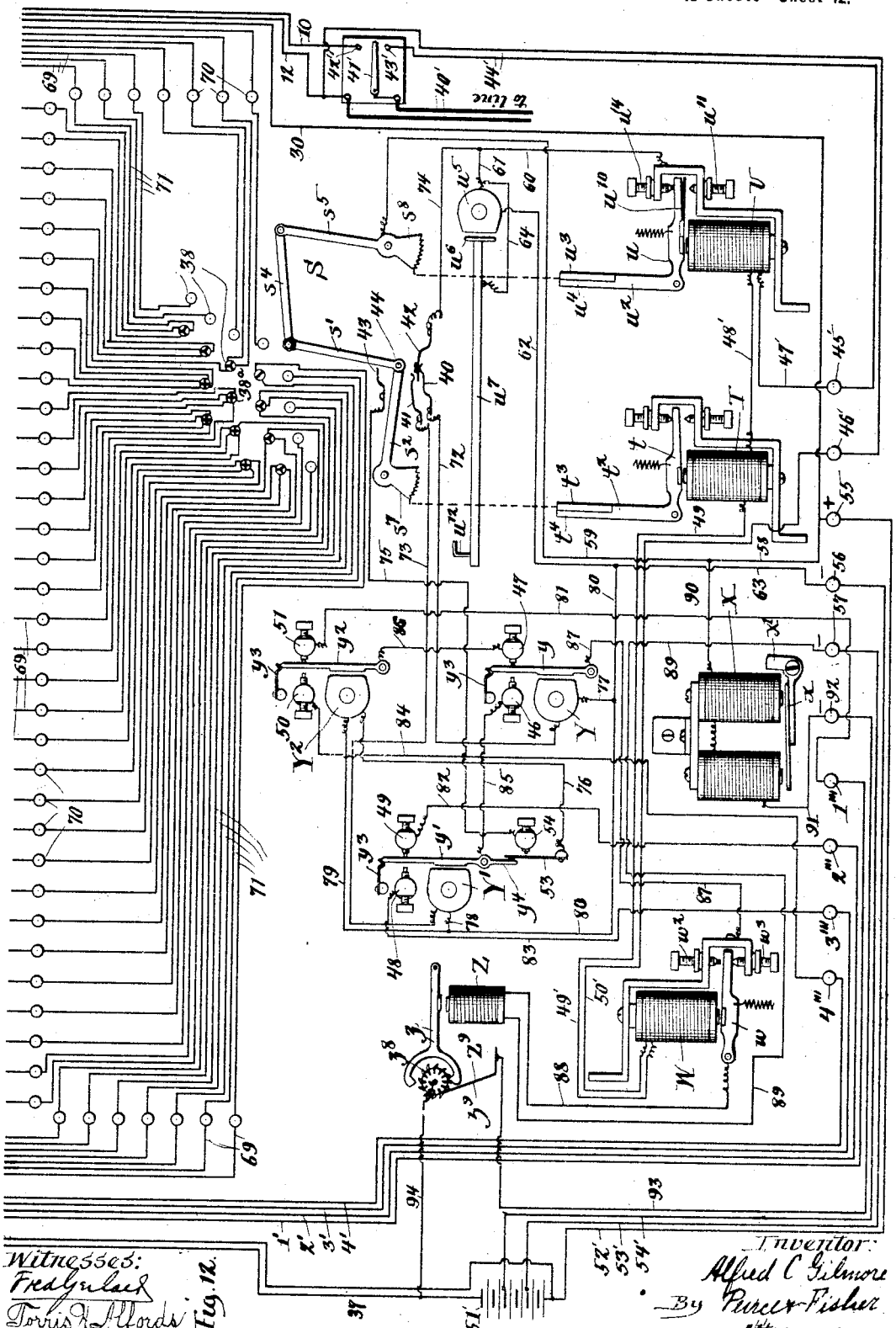

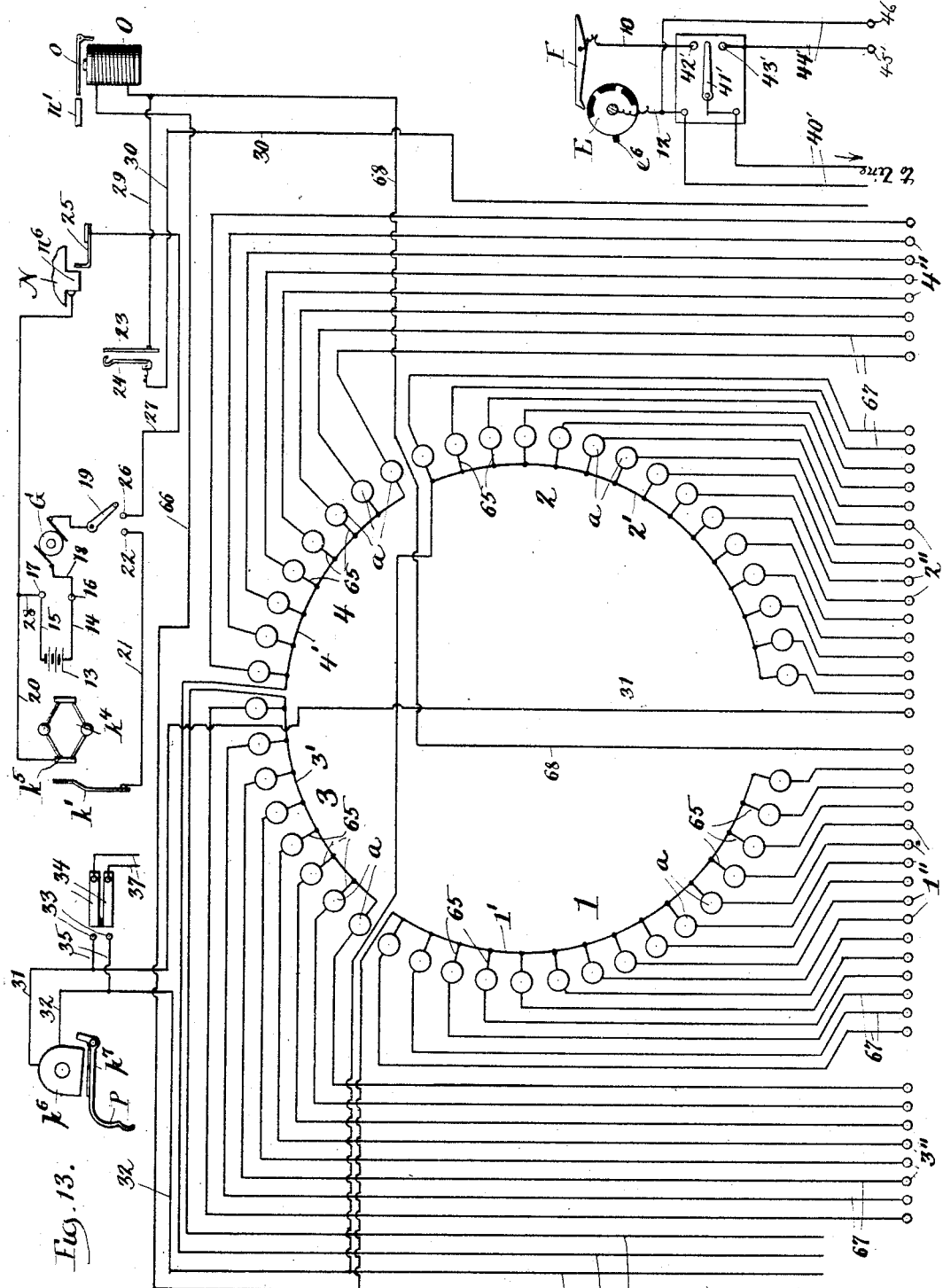

UNITED STATES PATENT OFFICE.

ALFRED C. GILMORE, OF CHICAGO, ILLINOIS.

AUTOMATIC TELEGRAPH.

SPECIFICATION forming part of Letters Patent No. 695,203, dated March 11, 1902.

Application filed April 22, 1901. Serial No. 56,924. (No model.)

*To all whom it may concern:*

Be it known that I, ALFRED C. GILMORE, of Chicago, Cook county, Illinois, have invented certain new and useful Improvements in Automatic Telegraphs, of which the following is declared to be a full, clear, and exact description.

The improvement designs to provide automatic transmitting and receiving mechanism for telegraph and like electrical selective systems by which the ordinary long and short electric impulses corresponding to the "dot" and "dash" signals of a code similar to that used in the Morse telegraph may be transmitted over a single line and in which the signals are made at the receiving end by means operated by separate electrical devices, which are quick and slow acting to respectively correspond to the dot-and-dash signals of the code. The signals are transmitted by a series of separate finger-keys similar to those of an ordinary type-writer, and they are preferably recorded at the receiving end by the automatic operation of an ordinary type-writer or similar printing device.

The improved transmitter, as well as the receiver, is preferably in the nature of an attachment to an ordinary type-writer, so that a printed record of the message as it is sent over the line is made both at the transmitting and receiving end. From the record at the transmitting end the accuracy of the message may be verified and all mistakes easily noted and corrected. Preferably, also, both the transmitter and receiver are attached to a single type-writer or similar printing device, and suitable means are provided whereby the instrument may be set to operate either as a transmitter or receiver. It will be understood, however, that this construction is not necessary and that the transmitter and receiver may be, if desired, mounted upon separate instruments.

The instruments are provided with the type-bars, paper-carriage, &c., of the ordinary type-writer, and both transmitter and type-writer are operated by the same series of finger-keys in sending a message.

As above stated, the instrument is designed to transmit the ordinary dot-and-dash signals of a suitable code and render such signals uniform and distinct. The operator, too, is relieved from liability of "operator's cramp," which is often imposed by the constant use of the ordinary transmitter. The transmitter could be used to send signals to an ordinary Morse sounder with great advantage over the system now in use, but is particularly designed to be used in connection with my improved printing-receiver. It is to be understood, however, that the transmitter as a separate instrument forms no part of the present invention, but that the essential features of the same herein disclosed are described and claimed in a separate application filed by me upon January 29, 1902, Serial No. 91,787.

Printing-telegraphs and like selective apparatus heretofore designed use either the expensive multiple-wire system or the single-wire system with synchronously-operating motors or type wheels. Other single-wire systems operate by transmitting a number of electrical impulses, a different number for each character, or impulses of opposite polarity or of different strengths of current. These systems are either easily disarranged by weather conditions or otherwise, slow in operation, or are of such a nature that they cannot be used in connection with the duplex and quadruplex systems of telegraphy. In the system devised by me the ordinary uniform current impulses of two different lengths (the dot and the dash) of the code are employed, which by a particular arrangement of electrical magnets are caused to actuate a signal-making switch to close local circuits at the receiving-station, which local circuits by suitable means operate the signal-making means or the type-bars of a type-writer of ordinary construction or a similar machine to properly record the message. This system has the advantage that it is not easily affected by weather conditions, may be used with duplex and quadruplex systems, and possesses the further advantage that the selective apparatus, signal-maker, or printing device to be operated may be placed in a local circuit which is controlled by a relay actuated from the line-circuit, which is of course not possible in systems depending upon current impulses of different strength. The signals may be transmitted over the wire to the improved receiving instrument by any suitable transmitter, preferably automatic, by which long and short electrical impulses could be transmitted over the line; but I prefer to employ the improved form of transmitting mechanism set forth and to combine the transmitting and receiving mechanisms in a single instrument, as illustrated in the accompanying drawings. When the instrument is acting as a receiver, not only are the type-bars operated by suitable electrical devices, but also means are provided whereby the paper-carriage may be automatically returned to its starting-point to commence a line of print, and means are provided to automatically rotate the cylindrical platen of the type-writer to properly space the lines upon the paper. By this arrangement the operation of the instrument as a receiver is rendered entirely automatic and there is no necessity for the presence of an operator as the message is being recorded.

The particular form selected to illustrate my invention is shown in the accompanying drawings and set forth in the following description, and the invention is particularly pointed out in the appended claims.

In the drawings similar reference characters apply to similar parts throughout.

Figure 9:
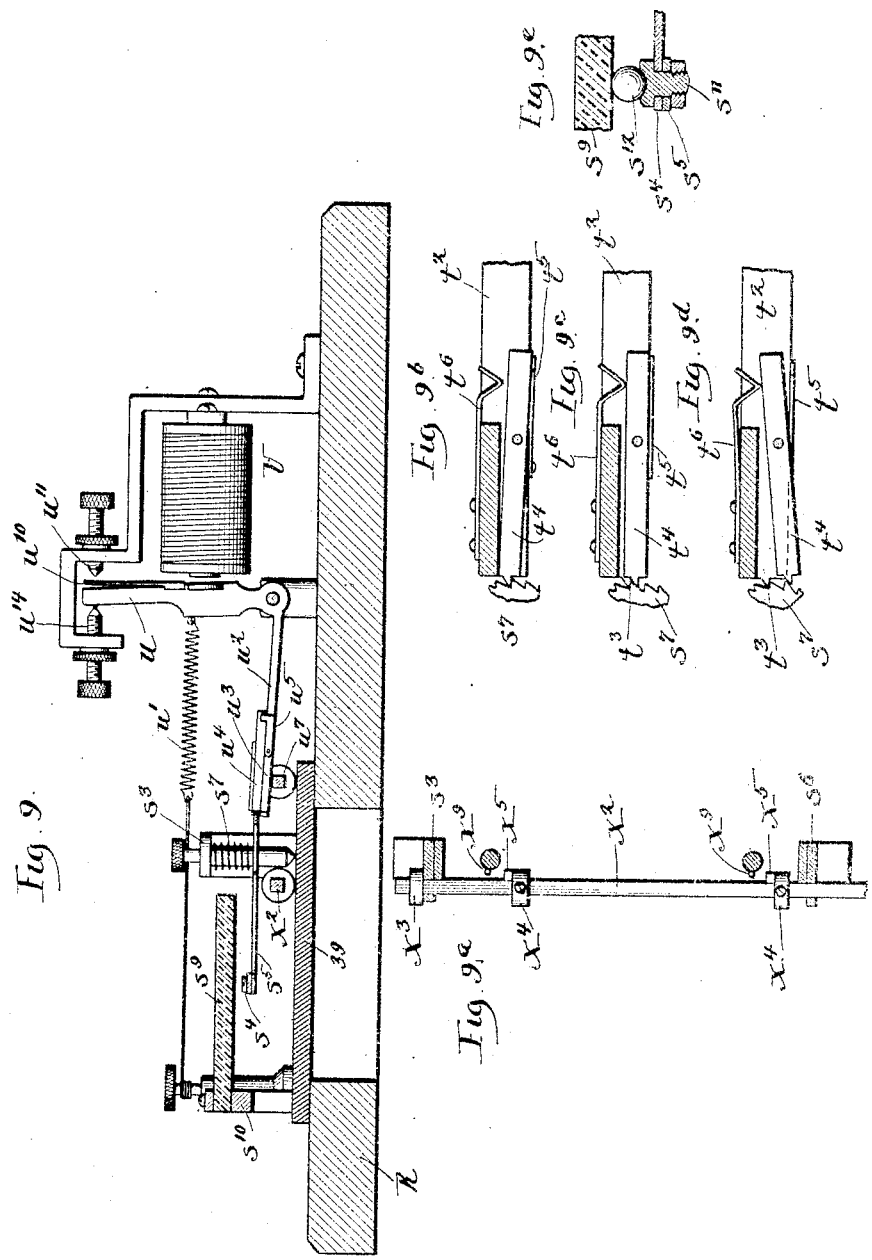
Figure 10:
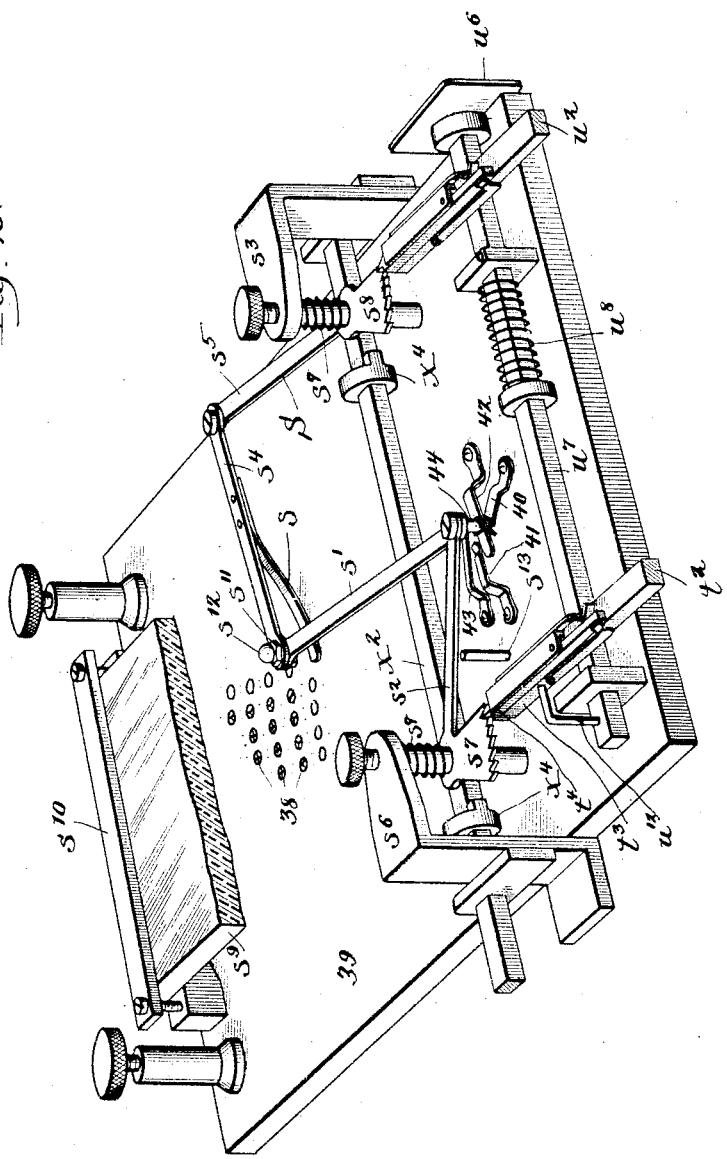

Figure 1 is a view in sectional elevation of the combined automatic transmitting and receiving mechanism as applied to a typewriter of ordinary construction, parts being omitted for the sake of clearness. Fig. 2 is a plan view of the upper part of the type-writer and attachments. Fig. 3 is a rear elevation of the same. Fig. 4 is a detail plan view of the carriage-return mechanism, parts being shown in cross-section. Fig. 4$^a$ is a detail view in vertical section taken on the line $a\,a$ of Fig. 4. Fig. 4$^b$ is a detail end view of parts shown in Fig. 4$^a$. Fig. 5 is a detail view in vertical section, taken on the line 5 5 of Fig. 2. Fig. 5$^a$ is a detail view in vertical section of the carriage-return gearing. Fig. 5$^b$ is a detail view in vertical section of the transmitting device. Fig. 6 is a view in vertical elevation of the rear end of the type-writer, showing the transmitting mechanism and operating-motor. Fig. 6$^a$ is a view in vertical section of the same. Fig. 7 is a detail view in vertical section of the line-spacing mechanism. Fig. 7$^a$ is a detail view in vertical elevation of parts shown in Fig. 7. Fig. 7$^b$ is a detail plan view of the transmitting device with the contact-fingers or transmitter-switches omitted for the sake of clearness. Fig. 8 is a plan view of the receiver-switchboard. Fig. 9 is a view in vertical section of the receiver-switchboard, taken on the line 9 9 of Fig. 8. Fig. 9$^a$ is a detail view of the switch-return mechanism, parts being shown in cross-section. Figs. 9$^b$, 9$^c$, and 9$^d$ are detail sectional views of the shifters for the switch mechanism. Fig. 9$^e$ is a detail sectional view of part of the switch mechanism. Fig. 10 is a perspective view of the universal switch mechanism and connected parts. Fig. 11 is a detail plan view of a circuit-controller for the switchboard-restoring magnet. Fig. 11$^a$ is a sectional view taken on the line $a\,a$ of Fig. 11 in the direction of the arrows. Fig. 11$^b$ is a similar sectional view taken on the line $b\,b$ of Fig. 11 in the direction of the arrows. Fig. 12 is a diagrammatic view of the receiver-switchboard circuits. Fig. 13 is a diagrammatic view of the operating-circuits for the instrument.

In the drawings I have illustrated my improvements as applied to the well-known typewriter of Remington style; but it will be understood that it may be applied to other forms of ordinary type-writer construction without departure from the invention.

In Fig. 1 the instrument is shown mounted upon an inclosing casing A, containing the magnets for operating the type-bars of the type-writer. The type-writer comprises the base-frame B, mounted upon supports $b$, by which it is secured in place over an opening $a$ in the top of case A. It is provided with the usual top plate $b'$, supported from frame B by the corner-posts $b^2$. Carriage-guideways $c$ are mounted upon the top plate $b'$, upon which travels the paper-carriage C, provided with the usual revolving paper-platen $c'$. Type-bars $d'$ are pivoted in the usual manner to a ring $d^2$ on the top plate. The finger-keys D of the instrument are of the usual lever form, arranged side by side, and extend from the keyboard back to the common fulcrum $d^3$. Springs $d^4$ are interposed between a suitable cross-bar $d^5$ and the separate key-levers, so as to hold said keys in the normal elevated position against the stop-bar $d^6$. Connecting-links $d^7$ are pivoted to the tailpieces of the type-bars $d'$ and are suitably secured to jacks $d^8$, which in turn are pivoted to the separate key-levers. The machine is also provided with the usual space-bar $d^9$ and universal bar $d^{10}$. For the sake of clearness the carriage-operating mechanism is omitted from Fig. 1 and only two of the type-bars are shown, it being understood that the other keys and connected parts are similarly constructed. This is an ordinary form of type-writer construction and need not be more specifically described.

*Transmitting mechanism.*—Upon a rear extension of the main frame B is mounted the transmitter base-plate $e$, of metal, secured thereto and separated therefrom by suitable insulated supports $e'$. Upon the plate $e$ are carried the upwardly-projecting studs $e^2$, provided with pointed adjustable screws $e^3$, which form cone-bearings for a rotatable contact-cylinder E. The contact-cylinder is divided by inlaid strips $e^4$, of insulating material, into a series of cylindrical contact surfaces or rings $e^5$, one for each character of the code to be transmitted, as shown in Fig. 7$^b$, and each ring $e^5$ is divided by inlaid insulated pieces into a series of long and short contacts, as shown in Fig. 5$^b$. The contact-surfaces vary with each separate ring $e^5$ in keeping with the letter, character, word, or signal to be transmitted by that particular ring. Fig. 5$^b$ shows a ring provided with a series of contacts designed to send a long and three short impulses, (a dash and three dots,) which by the Morse code signifies the letter "B." A metal upright $f$ is mounted upon the base-plate $e$ and is preferably cast in piece therewith. The upright is provided at its upper edge with a series of projections, between which are pivoted upon a rod $f'$ a series of transmitter-switches F, one for each ring or series of contacts $e^5$ upon the contact-cylinder E, and with which contacts the inner ends or toes of the transmitter-switches are adapted to engage. Switches F are provided with V-shaped tailpieces $f^2$ and are normally held out of engagement with the contact-cylinder by a series of upright spring-latches $f^3$, suitably secured to the base-plate $e$ and provided at their upper ends with pointed offsets $f^4$. The pointed offsets $f^4$ are normally in engagement with the upper faces of the V-shaped tailpieces $f^2$ to hold the transmitter-switches out of contact. Each of the switches F is provided with a forwardly-projecting spring-strip $f^5$, each of which is connected by flexible thread or wire $f^6$ to its corresponding finger-key D, thus forming loose one-way connections between the key-levers and the transmitter-switches—that is to say, whenever one of the key-levers is depressed the corresponding switch will be thrown into contact with the cylinder, but the return of the key-lever to its normal upright position does not effect the depressed switch. When any one of the transmitter-switches F has been depressed into engagement with the rotatable contact-cylinder E, it is held into engagement therewith by the pointed projection $f^4$ upon its corresponding spring $f^3$, which is pressed over the pointed end of the tailpiece $f^2$ and engages the under face thereof. The switch-lever F is thus held into engagement with the proper ring or series of contacts $e^5$ upon the rotating cylinder. The circuit can then be traced from wire 10 to binding-post 11 upon the base-plate $e$, through the base-plate to upright $f$, switch F, contact-cylinder E to the upright standards or studs $e^2$, which are connected to the line by wires 12. The successive long and short impulses (dots and dashes) to complete the signal are produced by variation in length of the metallic parts of the various rings $e^5$. It is obvious that the transmitting instrument may be utilized to transmit the code combinations of long and short impulses through a local circuit in which is located a relay or pole-changer which will serve to transmit the impulses to the line. After the signal has been given the transmitter-switch F is automatically returned to its normal position, with the pointed portion $f^4$ of spring $f^3$ in engagement with the upper face of tailpiece $f^2$ by a projecting longitudinal strip $e^6$, of insulating material, on the rotating cylinder E. This strip $e^6$ extends the entire length of the cylinder, so as to engage near the end of the rotation thereof with any one of the series of transmitter-switches that has sent a signal and swing it about its pivot, depressing the tailpiece $f^2$ by the pointed projection $f^4$, and thereby lock it in its normal elevated position. The transmitter-switch is then in position to be again depressed at the will of the operator and again transmit its particular signal.

The contact-cylinder E is intermittently rotated by the following mechanism: Upon the rear of the frame of the instrument is secured a plate $g$, to which is adjustably secured the frame of a small electric motor G. Upon the plate $g$ is a rectangular block $g'$, which fits in a longitudinal guide-slot $g^2$ in the inner side of the motor-frame. In the block $g'$ and plate $g$ is threaded an adjustable thumb-screw $g^3$, which is provided with a shoulder engaging a suitable clamping-plate $g^4$, which extends on either side of the slot $g^2$ in the inner side of the motor-frame and which may be pressed into engagement with such side. By this means the frame and motor carried thereby may be adjusted in a vertical direction. Beneath and to one side of the motor is a U-shaped frame H, suitably secured to and extending upwardly from the base-plate $e$. Upon the upper end of the U-frame H is suitably mounted a train of gears $h'$, $h^2$, $h^3$, and $h^4$, gears $h'$ and $h^2$ mounted upon the shaft $h^5$ and gears $h^3$ and $h^4$ on stud-shaft $h^6$. When the instrument is set for transmitting, the motor will be lowered until the pinion $g^5$ upon its armature-shaft is in engagement with the gear $h'$. By this means the train of gears will be continuously rotated in the direction of the arrows. (See Figs. 6 and 6$^a$.) Upon the shaft of the contact-cylinder E is fixed a mutilated gear $e^7$, in position to be engaged and rotated by the gear $h^4$ of the train. Also fixed upon the shaft of the contact-cylinder is a circular cam-disk $e^8$, provided on its periphery with a notch $e^9$, as shown in Fig. 6$^a$. To the under side of the base-plate is pivoted a short forwardly-extending lever I, to which is pivoted a spring-pressed hooked detent or pawl $i$, provided with an insulating-section $i'$, which normally engages the notch $e^9$ of the cam-disk $e^8$. The inner end of the lever I is provided with a bent upright $i^2$, through the outer end of which is adjustably threaded a thumb-screw $i^3$. This thumb-screw abuts against a rock-arm $i^4$, pivoted to a hanger $i^5$, depending from the top plate $b'$. The lever I and its connected parts are normally upheld, with the thumb-screw $i^3$ in engagement with arm $i^4$, by means of a spring $i^6$, interposed between the frame B and the lever. The rock-arm $i^4$ is the means employed in the ordinary type-writer construction for operating the carriage-escapement and is operatively connected by a link $i^7$ to the universal bar $d^{10}$. Since the universal bar extends in the well-known manner transversely beneath all of the key-levers, it is obvious that when any key-lever is actuated the lever I and its connected parts will be depressed, and by means of the detent $i$ an initial partial revolution will be imparted to the shaft of the contact-cylinder E. This will bring the teeth of the mutilated gear $e^7$ into engagement with the teeth of the gear $h^4$, and the motor will rotate the contact-cylinder through the medium of the gear-train for a complete revolution, thereby transmitting the signal in the manner already described. During the revolution of the contact-cylinder the stop-pawl $i$ will ride upon the cylindrical surface of the cam-disk $e^8$ until it has completed a single revolution, at which point the mutilated portion of the gear $e^7$ will come opposite the teeth of gear $h^4$, and the pawl $i$ will again engage the notch $e^9$, and the switch-lever F, which has been depressed by the finger-key D, will be restored to its normal position by the insulating-strip $e^6$ upon the contact-cylinder. All parts are then again in position to transmit any desired signal.

In order that the signals shall be transmitted uniformly and distinctly, it is desired that the speed of the rotation of the contact-cylinder E shall be uniform and that such speed may be regulated as desired. These objects are accomplished by the following means: The motor G is operated by a circuit from a local battery 13, which is connected by suitable leads 14 and 15 to the binding-posts 16 and 17 upon a plate $g^6$, of insulating material, secured to the upper end of the motor-frame. In the circuit between binding-posts 16 and 17 is interposed a suitable governing mechanism K, which is mounted upon the U-frame H. A strip $k$ of insulating material, carrying a spring-contact $k'$, is mounted upon a screw-threaded rod $k^2$ and a guiding-rod $k^3$. These rods are longitudinally supported upon a frame H, as shown in Fig. 3. Upon the shaft $h^5$, which is continuously rotated by the motor, as previously described, is mounted a small centrifugal ball-governor $k^4$, of usual construction. The ball-governor $k^4$ carries a switch $k^5$, which is arranged to engage the spring-contact $k'$. One side of the motor is connected by wire 18 with the binding-post 16, and the other side is connected to the lever of a switch 19, mounted upon an insulating-plate $g^6$. The binding-post 17 is connected by a lead 28 to the frame and thence by wire 20 to the U-frame H, and the spring-contact $k'$ is connected by a lead 21 with the contact 22 of the switch 19. The circuit is then completed from binding-post 16 through the motor by lead 18, thence to switch 19, and by wire 21 to spring-contact $k'$, to switch $k^5$, from thence through the metal of the U-frame H and lead 20, frame, and wire 28 to the binding-post 17. When, however, the speed is excessive, the governor will break the circuit and reduce the speed in the well-known manner. The insulating-strip $k$ is spring-held in one direction by a spring $k^7$, coiled about the threaded rod $k^2$, and the latter is provided with a thumb-nut $k^8$, so that the position of the strip may be shifted and the governing device set to give the desired operating speed. This operating-circuit for the motor G is clearly indicated in the diagrammatic view, Fig. 13.

*Automatic printing mechanism.*—When the instrument is set to automatically receive and record an incoming message, the type-bars and other parts of the type-writer are automatically operated by a series of magnets located in a local circuit. This circuit is closed by a selective signal-making switch mechanism, which is operated by the dot-and-dash electric impulses to close the local circuit through the proper mechanism, and thereby operate the corresponding type-bar or other device.

Within the box or casing A is conveniently located a series of magnets $a'$ for automatically operating the key-levers with their corresponding type-bars and the universal bar of the instrument. (See Fig. 1.) In Fig. 1 two of these magnets are indicated, the remainder being omitted for the sake of clearness. The pivoted armatures $a^2$ of the magnets $a'$ are connected by links $a^3$ to plates $a^4$, which are pivoted to suitable standards $a^5$ upon the bottom of the magnet-box. To the opposite ends of these plates $a^4$, which, in effect, form bell-crank levers, are pivotally secured the links $a^6$, which project through the opening $a$ in the top of the magnet box or casing A and are pivotally secured to the separate key-levers D. The links $a^3$ and $a^6$ are provided with suitable turnbuckles $a^7$, by which their lengths may be properly adjusted. One of the operating-links $a^6$ is, as indicated in Fig. 1, connected to the universal bar $d^{10}$ of the type-writer. By this means whenever the local circuit is closed through any one of the magnets $a'$ the corresponding key-lever and type-bar or the universal space-bar will be actuated, thereby printing the message upon the paper on the carriage-platen and advancing the paper-carriage step by step in the manner usual with the ordinary type-writer.

The paper-carriage frame C is mounted, as usual, to travel back and forth upon the type-writer and is provided with the friction-rollers $c^2$, which engage the rails $c$, mounted upon the top plate $b'$ of the instrument. The carriage is positively driven in one direction, as usual, by means of a driving-strap $c^3$, connected thereto at one end and operated by a coiled spring within the casing $c^4$, mounted on the frame, as shown in Fig. 2. The step-by-step feed of the carriage is effected by the mechanism illustrated in Fig. 5, which is of common construction and comprises the rock-arm $c^5$, which is operatively connected to the universal bar $d^{10}$ through the medium of connecting-link $i^7$ and rock-arm $i^4$. (See Fig. 6$^a$.) The upper end of the rock-arm $c^5$ is provided with the well-known fixed and loose dogs $c^6$ and $c^7$, which engage with the ratchet-wheel $c^8$. The ratchet-wheel $c^8$ is mounted upon the end of a shaft $c^9$, journaled within a block $c^{10}$ upon the top plate of the type-writer, and to the inner end of which shaft is secured a pinion $c^{11}$, which intermeshes with the teeth of a rack $c^{12}$, mounted upon the carriage C. This mechanism forms the escapement of the well-known Remington type-writer and need not be more fully described in this connection. The ratchet-wheel $c^8$ is connected to the shaft $c^9$ by the usual pawl-and-ratchet mechanism (indicated at $c^{13}$) in order to permit the carriage C to be returned to its starting-point to commence a line of print.

I provide means whereby when the mechanism is operating as a receiver the carriage may be automatically returned to recommence a line of print, which comprises the following mechanism: Upon the rear end of the shaft $c^9$ is fixed a beveled gear $c^{14}$, and upon the rear of the top plate $b$, within suitable uprights $l$, is journaled a shaft L. Upon this shaft are fixed keyed and loose clutch members $l'$ and $l^2$. To the loose clutch member $L^2$ is secured a beveled pinion $l^3$, which intermeshes with the beveled gear $c^{14}$ upon the end of the shaft $c^9$. Also mounted upon the shaft is a loose gear $l^4$, which is connected thereto through the medium of a volute coiled spring $l^5$. The coils of the spring $l^5$ are held in place by means of the bent arms $l^6$, secured to the face of the gear $l^4$. Connected to the top plate intermediate the uprights $l$ is a depending arm $l^7$, which carries upon a pair of stud-shafts the train of gears $l^8$, $l^9$, and $l^{10}$. The gear $l^{10}$ is positioned to intermesh with the gear $l^4$ of shaft L, and the gear $l^8$ is so placed that it will be engaged with the pinion $g^7$ upon the inner end of the armature-shaft of motor G when the latter is raised to its upper position. The motor is so raised whenever the instrument is set to act as a receiver, which not only brings gear $g^7$ into engagement with gear $l^8$, but also disengages gear $g^5$ upon the outer end of its armature-shaft from the train of gearing which serve to operate the contact-cylinder E of the transmitting mechanism.

The usual margin stop-bar N is not fixed as in the usual type-writer construction, but is mounted upon the pintles $n$ and $n'$ between the uprights $n^2$ at the rear of the top plate of the machine, so as to permit of a slight longitudinal movement. A rearwardly-projecting arm $n^3$ is connected to the bar N, and its rear forked end engages the sliding clutch member $l'$, which is keyed to the shaft L, as shown in Fig. 4. The bar N is normally urged to the right, and thus tends to throw the clutch members $l'$ and $l^2$ into engagement by means of a spring $n^4$, interposed between a collar $n^5$ upon the outer end of pintle $n'$ and the upright $n^2$; but the bar N is normally held toward the left (see Figs. 4 and 4ª) by means of the upwardly-spring-pressed armature $o$ of the magnet O, which is secured to the top plate of the machine by means of the frame $o'$. The armature $o$ is provided with a bent tailpiece $o^2$, which is pressed into engagement with the upwardly-extending portion of the frame $o'$ by means of a spring $o^3$, so as to position said armature opposite the end of the pintle $n'$ of the bar N, and thereby lock the rod in its normal position toward the left. (See Fig. 4ª.) Upon the rear of the top plate, between the upper ends of the uprights $n^2$, is mounted the usual carriage guide-rod $c^{14}$, which carries a sliding sleeve $c^{15}$. This sleeve is engaged by the forked end of a rearwardly-extending part $c^{16}$, connected to the carriage-frame C. Upon a collar $c^{17}$, adjustably fixed to the rod $c^{14}$, is mounted a pair of normally open insulated spring-contacts 23 and 24, which form a circuit-controlling switch and which are arranged to be engaged and closed by a projection $c^{18}$ upon the part $c^{16}$ when the carriage has reached the limit of its traverse at the end of a line of print. (See Fig 2.) Upon the upright $n^2$ is mounted a suitably-insulated spring-contact 25, which is arranged to be engaged by a projection $n^6$ upon the bar or switch N when the latter is moved slightly toward the right. (See Fig. 4.) The operation of this automatic carriage-return is as follows: When the instrument is set to operate as a receiver, the lever of switch 19, which controls the local operating-circuit for the motor G, is placed to engage its contact 26. This contact is connected by a lead 27 to the spring-contact 25 upon the frame of the instrument. If the operator when sending a message desires to return the carriage of the instrument at the other end of the line, he will transmit a special signal to close the local operating-circuit through the magnet O, which when energized withdraws its armature from engagement with the pintle $n'$. This permits a slight movement of the switch-bar N toward the right under the influence of spring $n^4$. (See Fig. 4.) The motor-circuit will then be completed as follows: from binding-post 16 through the motor to switch 19, through lead 27 to contact 25, through the switch-bar N and the frame of the machine back to the binding-post 17, which is connected to the metal of the frame by a short wire 28. The motor will then be operated and will drive the shaft L through the train of gears $l^8$, $l^9$, $l^{10}$, and $l^4$. The shaft L through the medium of the clutch members $l'$ and $l^2$, which have been thrown into engagement by the shift of bar N and the beveled gears $l^3$ and $c^{14}$, will rotate the shaft $c^9$ of the carriage escapement mechanism, and the rotation of this shaft through the medium of the pinion $c^{11}$ and rack $c^{12}$ will return the paper-carriage to its starting-point against the tension of the spring contained in the casing $c^4$ for the purpose of recommencing a line of print. The weight of the carriage and connected parts, as well as the tension of its operating-spring, is considerable, and for this reason the coiled spring $l^5$ is interposed in the train of operating mechanism. This spring permits the motor to start and acquire momentum under a light load, so that a much smaller motor may be employed than if the load were thrown at once upon the motor as soon as started. The carriage thus travels toward the left in Fig. 2 until the part $c^{16}$ thereon comes into engagement with an abutment $n^7$, adjustably positioned upon the bar N, as shown in Figs. 2 and $4^a$. By this means the bar N is moved slightly toward the left, thus withdrawing the lug $n^6$ from engagement with the spring-contact 25 and breaking the circuit through and stopping the motor. By this movement of the rod $n$ the clutch members $l'$ and $l^2$ are also thrown out of engagement, so as to permit the free rotation of the feed-shaft $c^9$ during the travel of the carriage in the opposite direction. The local circuit through the magnet O has been in the meantime broken by the operation of the selective switch, and its armature $o$ will be returned by its spring in the position to engage the pintle $n'$ of the bar N, thus locking the parts in their normal position and in a condition to again return the paper-carriage as desired by the operator at the transmitting end of the line.

When the carriage has traveled to the extreme left in Fig. 3, it will be automatically returned by the mechanism above described without necessitating the transmission over the line of the special carriage-return signal. This is accomplished, since the projection $c^{18}$ upon the carriage will engage and close the spring-switch 23 and 24. The spring-contacts of this switch are connected by wires 29 and 30 with the leads of the local circuit through the magnet O. The magnet O will thus be energized and will release the bar N, which then closes the local circuit through the motor G and throws into engagement the clutch members $l'$ and $l^2$, so that the carriage will be automatically returned in the manner above described. The circuits above described are clearly indicated in the diagrammatic view, Fig. 13.

The paper-platen $c'$ is provided with line-spacing mechanism similar to that used in the ordinary Remington type-writer, and which comprises the handle P, pivoted to the carriage, as at $p$, and which serves to operate the rock-arm $p'$, carrying at its upper end the pivoted spacing-detent $p^2$ and the fixed locking-detent $p^3$. These detents engage with a suitable ratchet $p^4$, fixed to the end of the platen $c'$. A spring-pressed arm $p^5$ is connected to the carriage and is provided at its free end with a roller engaging the teeth of ratchet $p^4$ to frictionally hold the platen against displacement. These parts, as above stated, are of the usual construction and need not be more fully described. Means are provided whereby this line-space mechanism may be automatically operated by the transmission of a special signal over the line and also whereby it will be automatically operated whenever the carriage is returned to the right-hand end of the machine to commence a line of print. Suitably mounted upon the carriage above the operating-handle P is a magnet $p^6$, having downwardly-projecting poles, which when the magnet is energized attract a plate-armature $p^7$, secured to the arm P, as indicated in Figs. 2, 7, and $7^a$. The magnet $p^6$ is connected by the leads 31 and 32 in the operating-branch of the local circuit. Whenever the transmitting operator desires to operate the line-space of the instrument at the receiving end, he will send a special signal over the line, which through the medium of the selective switch mechanism will close the local-battery-circuit through the magnet $p^6$ and advance and rotate the paper-platen through the desired line-space. An automatically-operating switch is also provided for closing the circuit through the magnet $p^6$ whenever the carriage returns to the right to commence a line of print. This switch comprises the contact-pins 33 and the spring-contacts 34, mounted upon a plate of insulating material $p^8$, which is secured to the upright $n^2$ at the rear right-hand end of the machine, as shown in Figs. 2, 3, $4^a$, and $4^b$. The pins 33 are connected by wires 35 to the leads 31 and 32 of the magnet $p^6$, and the spring-contacts 34, connected together at their outer ends by an insulating-strip 36, are connected by the leads 37 to the local battery. An upright $p^9$, adjustably mounted upon the rear of the carriage C, carries at its upper end a rearwardly-extending bent arm $p^{10}$. A cam-shaped switch-closing device $p^{11}$ is pivoted upon the end of the arm $p^{10}$, is weighted at its outer end, and provided at its inner end with a stop $p^{12}$, which engages the arm $p^{10}$, as shown in Fig. $4^a$, and prevents the rotation of the switch-closer in one direction. When the carriage is returned toward the left, the switch-closer engages the spring-contacts 34 of the switch and presses them into contact with the pins 33, thus closing the circuit through the magnet $p^6$ and operating the line-space. Upon the return of the carriage toward the left the switch-closer $p^{11}$ is knocked upwardly, when it engages the spring-contacts 34, and so fails to close the circuit; but after it passes the switch it is returned to the normal, with the stop $p^{12}$ in engagement with the arm $p^{10}$ by its outer weighted end and in condition for again closing the circuit when the carriage is again moved to the right.

*Selective switch mechanisms.*—These mechanisms are all mounted upon a suitable switchboard R, with which each of the instruments will be provided. The signal-making or selective switch consists of a spring-strip $s$, secured to one of the links $s^4$ of a universal mechanism or four-bar linkage S. Link $s^4$ is pivoted to the end of a link $s^5$, normally extending approximately at right angles thereto, which is pivoted at its opposite end in a suitable adjustable bearing $s^3$, fixed to the switchboard R. Link $s^4$ is also pivoted to one end of a link $s'$, which extends normally in the same direction and approximately parallel to the link $s^5$. Link $s'$ is pivoted at its opposite end to a fourth link $s^2$, which normally extends approximately at right angles thereto and is pivoted within an adjustable bearing $s^6$, fixed on the switchboard. It will be observed that links $s^2$ and $s^5$, extending approximately at right angles to each other, and that springs $s^9$, coiled about their journaled ends, tend to swing them in directions at right angles to one another, as indicated by the arrows in Fig. 8, so that by properly combining these two motions the switch $s$ can be caused to contact with any one of a series of contact-pins 38 placed in intersecting rows in a plate 39, of insulating material, secured to the switchboard R.

Mounted on the switchboard opposite the journaled ends of links $s^2$ and $s^5$ are electromagnets T and U, provided with suitable rocking armatures $t$ and $u$. These magnets are connected in series in the same circuit and are when the instrument is acting as a receiver connected to or operated from the main line. Magnet T is a high-resistance or quick-acting magnet, and its armature is provided with a light spring, so that it responds to all electric impulses, both the dashes and dots transmitted over the line, and magnet U is a relatively low-resistance or slow-acting magnet and its armature is provided with a relatively heavy spring $u'$ and only responds to the long electric impulses or the dashes. Connected to the armature $t$ is a rocking shifter $t^2$ for the link $s^2$, which shifter is provided at its outer end with a rigid dog $t^3$ and a loose pivoted dog $t^4$. Relatively light and heavy strip-springs $t^5$ and $t^6$ are arranged to engage opposite faces of the pivoted dog $t^4$. On the link $s^2$ is a segment $s^7$, provided with ratchet-teeth and with which the loose dog $t^4$ normally engages, as indicated in Fig. 9$^b$, in which position it is pressed against the light spring $t^5$ and away from the relatively heavy spring $t^6$. When the armature $t$ is attracted and the rocking arm or shifter is raised, the loose dog $t^4$ is thrown out of and the fixed dog $t^3$ is thrown into engagement with the ratchet-teeth of the segment $s^7$. The loose dog is then spaced forward by the light spring $t^5$ into the position shown in Fig. 9$^c$. In this position the relatively heavy spring $t^6$ acts as a stop for the dog $t^4$, so that the latter will be spaced ahead through the distance of one tooth, and when the armature $t$ is released and the shifter is depressed the loose dog will engage with the next succeeding tooth upon the ratchet $s^7$. The link $s^2$ is then free to be shifted by its spring $s^9$ one step in the direction of the arrow. When the link $s^2$ is returned to its normal position in the manner hereinafter described, the ratchet-teeth on the segment $s^7$ will move past the dog $t^4$, the latter being shifted against the tension of the heavy spring $t^6$, as indicated in Fig. 9$^d$. This peculiar escapement is simple in construction, not liable to get out of order, and effects the step-by-step movement with certainty. A similar rocking shifter $u^2$ for the link $s^5$ is operatively connected to the armature $u$ of the magnet U, and the fixed and loose dogs $u^3$ and $u^4$ operate to shift the link $s^5$ one step at a time in the direction of the arrow (see Fig. 8) by operating upon the toothed segment $s^8$ of that link.

As already stated, the quick-acting or dot magnet T is operated by all impulses coming over the line, whereas the slow-acting or dash magnet U is only operated by the long impulses. To prevent the dot-shifter from operating when a long impulse is received, a small magnet $u^5$ is mounted upon the switchboard, and its armature $u^6$ is mounted upon the end of a longitudinally-sliding metal rod $u^7$, pressed by a spring $u^8$, coiled about the rod toward the left, as shown in Fig. 8. The magnet $u^5$ is energized by a branch of the local circuit, which is closed through the same whenever the armature $u$ is drawn up by means of a spring-contact switch $u^{10}$ upon its armature $u$ and a contact-pin $u^{11}$ on the metal frame of the magnet. The armature $u^6$ and sliding rod $u^7$ will thus be drawn toward the right against the tension of the spring $u^8$, and an upwardly-projecting bent pin $u^{12}$ upon the end of the rod engages the loose dog $t^4$ of the shifter $t^2$ of the dot-magnet and prevents it from being moved forward by its spring as the shifter is raised. As the armature $u$ will be rocked by its heaver spring before the armature $t$, it is necessary to provide a shunt in the branch of the local circuit, which passes through the magnet $u^5$ and which is closed as soon as the bent pin $u^{12}$ engages the dog $t^4$. The magnet will thus remain energized and the dog $t^4$ will remain locked until the armature $t$ is released and the shifter $t^2$ and dog $t^4$ drop away from the pin $u^{12}$. By this means the dog $t^4$ will drop back into engagement with the teeth of segment $s^7$ without having stepped the link $s^2$. The rod $u^7$, carrying the armature $u^6$ and locking-pin $u^{12}$, is normally held toward the left by the spring $u^8$ against a stop $u^{13}$, which engages a collar on the rod, and the end of the armature $u$ is normally held by its spring against a pin $u^{14}$, provided with an insulating bearing-point, so that the circuit through the magnet $u^5$ is normally broken.

As shown in Figs. 8 and 10, the contact-pins 38 are arranged in the path of travel of the selective switch $s$ in a series of concentric lateral and transverse rows, and are so located that the switch in its step-by-step motion, produced by the shifters of magnets T and U, engages with any one of such pins. The series of contact-pins 38 are connected by suitable leads to the series of signal making or printing magnets $a$ and to the special magnets O and $p^6$, and all of the magnets are arranged to be connected on the other side to the universal mechanism S. This circuit forms the operating branch of the local circuit. It is apparent from the foregoing that a short or dot impulse will move the switch *s* in one direction from one lateral row of contact-pins 38 to the other and that a long or dash impulse will move the switch in a direction at right angles thereto from one transverse row of pins 38 to another, so that any combination of dot and dash signals or impulses will move the universal mechanism S and bring the selective signal-making switch *s* into engagement with the proper pin, close the operating branch of the local circuit through the proper magnet, and operate the type-bar which corresponds to the particular combination of dots and dashes. It is obvious that each one of the pins may be used to represent a single letter or character and arrange to operate through the medium of a selective switch the magnet corresponding thereto; but in order to suitably receive and record a large number of signals (I have provided for forty-eight) such an arrangement would necessitate the use of a correspondingly-large number of contact-pins, and the number of step-by-step movements of the universal switch mechanism to engage the pins of some of the signals would be such as to render the printing of a message unduly slow. For this reason I employ a comparatively few number of pins, (twenty are illustrated in the drawings, although it is obvious that a greater or less number may be provided,) which may be reached by the universal switch in a few number of steps, thus materially increasing the speed of the instrument.

In order to prevent the signal from being made or printed until the selective switch *s* comes to rest upon the proper pin, a magnet W is mounted upon the switchboard and is located in series in the circuit with the magnets T and U. This magnet is preferably of low resistance, and its rocking armature *w* is provided with a very light spring *w'*, so that it will be held up as all impulses, both long and short, are received, except during the pauses or spaces between the completed signals. This armature *w* constitutes a switch interposed in the operating branch of the local circuit through the actuating-magnets of the printing or signal-making mechanism and as a signal is being received is held up against a pin $w^2$, having an insulated bearing-point, so that the operating branch of the local circuit will remain open until the pause at the end of a completed signal, when the switch on armature *w* will be drawn by its spring against a metal contact-point $w^3$. At this point the selective switch *s* will have come to rest upon the proper pin and the actuating branch of the local circuit will be closed through the magnet corresponding to the signal received.

The link $s^4$, carrying the switch *s* and the link *s'*, plays beneath a small guard-plate $s^9$, of glass, which is supported by an upright $s^{10}$ on the insulating-plate 39, and from the upper end of which support it projects laterally over the contact-pins 38. (See Fig. 9.) The head of the pivot $s^{11}$, connecting the links *s'* and $s^4$, is recessed to receive a bearing-ball $s^{12}$, which is pressed upwardly by the spring-switch *s* against the glass plate $s^9$. By this means the spring-strip forming the switch *s* is held under a certain amount of tension, thus insuring perfect contact between the switch and the pins 38 in any of the selected positions. At the same time the ball rolls freely and without friction in contact with the under surface of the plate $s^9$ and little resistance is opposed to the movement of the universal mechanism S. As shown in Fig. 8 and diagrammatic Fig. 12, these pins 38 are divided by insulating-strips into contacts in correspondence with the different paths by which they may be reached by the selective switch *s* starting from the normal or home position—*i. e.*, the pins that are only reached by a single path are not divided, the pin that can be reached by two different paths is divided into two contacts, the pins that can be reached by three different paths are divided into three contacts, and the pins which can be reached by four or more different paths from the home position of the switch are divided into four contacts. The series of signal-making or printing magnets *a*, together with the special magnets O and $p^6$, are electrically divided into four "sets," and the connections between the pins 38 and the magnets are so arranged that the multiple "group" of contacts of any pin will be connected each to a magnet in a different set. In this arrangement it is obvious that when the selective switch *s* comes to rest upon any pin having a group of two or more contacts it will close the actuating branch of the local circuit through a group of two or more operating-magnets, each magnet of which group is located in a different set, and the switch will close the circuit at this point through all the magnets of a particular group irrespective of the path by which it has reached the pin corresponding to that particular group. It is therefore necessary to provide a supplemental switch mechanism for selecting one of the group of magnets which corresponds to the path by which the switch has reached a particular pin, which path of course corresponds to the combination of dots and dashes which represent the particular signal of the magnet to be selected. It is obvious that instead of pins divided into separate contacts by insulating material I may provide groups of pins, so that all those of a single group will be engaged by the switch when it has arrived at any one of a number of positions. This supplemental selective switch mechanism is controlled by four spring-contacts 40, 41, 42, and 43, mounted upon the insulating-plate 39 beneath the pivot 44 of the universal switch mechanism S. These contacts, together with the armature *u* of the dash-magnet U, serve to close a branch of the local circuit through a series of small magnets Y, Y', and Y², mounted upon the switchboard R in the manner hereinafter described. The spring-contact 42 is arranged with its end intermediate the ends of the contacts 40 and 41 and tends to spring upwardly into engagement with the contact 41. It is, however, normally engaged by but insulated from the pivot 44 and is depressed by said pivot into engagement with the contact-spring 40. The spring 43 is so placed that the pivot 44 will make and break contact therewith when the dot-magnet has advanced the link $s^2$ the second time. The armatures $y$, $y'$, and $y^2$ of the small magnets Y, Y', and Y² are all pivoted to the switchboard R to swing in horizontal planes. These armatures or supplemental switches are provided with pointed or cam-shaped ends engaged by locking-springs $y^3$, having a cam-shaped end portion by which the armatures will be locked whenever moved in one or the other direction. Adjustable contact-pins 46 and 47 are located on either side of the swinging armature $y$ and are so positioned that the armature will contact with either one or the other, accordingly as it is held up by or drawn away from its magnet, and the locking-spring $y^3$ will serve in the manner above mentioned to lock the armature $y$ into engagement with either of the contact-pins. Similar contact-pins 48 and 49 are provided on opposite sides of the armature $y'$ and contact-pins 50 and 51 on opposite sides of the armature $y^2$. A switch comprising a spring-contact 53 and an adjustable contact-pin 54 is mounted upon the board R, with the spring 53 normally out of contact with the pin 54. A tailpiece $y^4$ is provided on the armature $y'$ and is positioned to engage, through the medium of an insulated bearing-point $y^5$, with the spring-contact 53. By this means the latter will be pressed into engagement with the pin 54 whenever the armature $y'$ is drawn up by its magnet.

Means are provided for restoring all the switch mechanisms to the normal as soon as the transmitted signal has been made or printed. For this purpose a magnet X is mounted upon the switchboard R, the armature $x$ of which is pivoted to the switchboard to swing in a horizontal plane and is provided with a rock-arm $x'$, extending laterally intermediate the small magnets Y Y' Y², and the universal switch mechanism S. A rod $x^2$ is mounted to slide transversely within openings suitably located in the bearings $s^3$ and $s^6$ in proximity to fixed pivots of the links $s^2$ and $s^5$. The outer end of this rod is provided with a suitable collar $x^3$, engaging the bearing $s^2$, and other collars $x^4$ are adjustably mounted thereon intermediate the bearings $s^3$ and $s^6$. These collars $x^4$ are provided with pins $x^5$, arranged to engage shoulders $x^9$, mounted on pivots of links $s^2$ and $s^5$. Flexible connections $x^7$, in which light springs $x^8$ are interposed, extend between the rocking arm $x'$ and the several armatures $y$, $y'$, and $y^2$ of the magnets Y, Y', and Y². By this means after a signal has been received and its corresponding character printed and electromagnet X is energized the rocking arm $x'$ and rod $x^2$ operate to return the linkage S and switch $s$ to the normal, with the teeth of the segments $s^7$ and $s^8$ moving past the loose teeth or dogs $t^4$ and $u^4$. Stops $s^{13}$ are provided upon the plate 39 to prevent the overthrow of the mechanism S when it is so returned. At the same time the armatures $y$, $y'$, and $y^2$ will be returned by the flexible connections $x^7$ into engagement, respectively, with the contacts 47, 49, and 51, in which positions they will be locked by the springs $y^3$, as previously described. The rocking arm $x'$ and its connected parts will be returned to the normal, when the circuit through magnet X is broken by a spring $x^{10}$.

Means are provided for closing a branch of the local circuit through the magnet X, which comprises a switch mechanism mounted upon the switchboard and shown in detail in Figs. 11, 11ª, and 11ᵇ. This comprises a magnet Z, mounted upon a suitable metal base-plate $z'$. Between uprights $z^2$ at either end of the base-plate $z'$ are mounted in suitable adjustable bearings the shafts $z^3$ and $z^4$. Fixed to the shaft $z^3$ is the rocking armature $z$ of the magnet Z, the outer end of which is provided with pallet-pawls $z^5$. The pawls $z^5$ are provided with pointed actuating-teeth which engage with the teeth of a ratchet $z^6$, fixed on the shaft $z^4$, which is rotated a step at a time by the pawls whenever the magnet Z is energized. The armature $z$ is normally upheld away from the magnet Z with the lower pallet-pawls $z^5$ in engagement with the ratchet $z^6$ by a suitable leaf-spring $z^7$, secured at one end thereof and bearing against the plate $z'$. The switch, which is interposed in the local branch of the circuit passing through the magnet W, comprises a commutator $z^8$, fixed upon the shaft $z^4$ and divided into a series of contact-surfaces corresponding in number with the teeth of the ratchet $z^6$. A spring-contact $z^9$ is mounted upon an insulating-block $z^{10}$, secured to the base-plate, and is positioned to normally engage with any of the insulating-strips of the commutator. The branch of the local circuit passing through the magnet W is connected by suitable leads to the insulated spring-contact $z^9$ and to the metal base-plate $z'$. The circuit through the magnet X is therefore broken at the commutator $z^8$. The printing or actuating branch of the local circuit is arranged to be closed whenever a signal is received through the magnet Z, thus operating the ratchet-wheel $z^6$ and rotating the commutator $z^8$. The spring-strip $z^9$ thus passes from one of the insulating-strips of the commutator over the intermediate contact-surface on the next insulating-strip. By this means the branch of the local circuit will be closed for an appreciable extent of time and the complete return of all of the parts of the switch mechanism to the normal is assured as soon as a signal received has been made or printed. A simple contact operated by a magnet would be inefficient for this purpose, as the interval through which the circuit would be closed would be too short.

*Circuits and operation.*—In this connection especial reference is made to the diagrammatic figures, Figs. 12 and 13. When the instrument is to transmit a message, as already stated, the switch 19 will be placed into engagement with its contact 22, thus closing the motor-operating circuit through the automatic governor. The motor will be lowered to bring the drive-gear $g^5$ into engagement with the operating-train of the transmitting contact-cylinder. The line-circuit (represented in Figs. 12 and 13 by wires 40') will be closed by a lever 41' and contact 42' through the conductors 12 and 10, leading, respectively, to the cylinder $e$ and transmitter-switches F. Messages may then be rapidly transmitted by play upon the finger-keys D in the manner already described.

In the instrument at the receiving end of the line, as already stated, the switch 19 will be brought into engagement with its contact 26, and the motor-operating circuit will be closed through the spring-contact 25, and the motor G will be raised to bring its driving-gear $g^7$ into engagement with the train for returning the paper-carriage C. The line 40' will be closed by the switch 41' being brought into engagement with its contact 43', and from thence by conductors 44' to the binding-posts 45' and 46' upon the switchboard, thus cutting out the transmitting mechanism. The line-circuit may be traced from binding-post 45' to magnet U by conductor 47', thence to magnet T by conductor 48' and by conductor 49' to magnet W, thence by conductor 50' back to the binding-post 46'. It is obvious that the magnets T U W may be located in a local circuit or circuits, which circuit is controlled from a line-relay or pole-changer instead of locating these magnets directly in the line-circuit. As already described, the dot-magnet T is arranged to respond to all impulses, both long and short, coming over the line, and the dash-magnet to respond only to the long impulses, while the armature $w$ of the magnet W is held up by the electric impulses at all times except during the pauses between the completed combinations of impulses forming the various character-signals. A local separate battery 51' is provided and is connected by suitable leads 52', 53', and 54' to the binding-posts 55, 56, and 57 on the switchboard. The branch of the local circuit between the binding-posts 55 and 57 serves to operate the actuating or printing magnets $a$. The branch between the binding-posts 55 and 56 serves to operate the locking-magnet $u^5$ and the small magnets Y, Y', and $Y^2$ of the supplemental switch mechanism. Whenever the dash-magnet is operated the local circuit can be traced through the magnet $u^5$ as follows: from binding-post 55 by wires 58 and 59 to the universal linkage S, thence by the toothed segment $s^8$ to the interengaging shifter $u^2$, armature $u$, and spring $u^{10}$ to contact-pin $u^{11}$, through the frame of the magnet $u$ and through the wires 60 and 61 to magnet $u^5$, and from thence by wires 62 and 63 back to the binding-post 56. Thus, in the manner already described, the armature $u^6$ and rod $u^7$ will be actuated and the bent locking-pin $u^{12}$ will be brought into engagement with the loose tooth $t^4$ of the shifter $t^2$ and prevent it spacing when raised by armature $t$. The circuit will then be closed through the magnet $u^5$ as follows: from binding-post 55 by wires 58 and 59 to switch mechanism S, toothed segment $s^7$, shifter $t^2$, and pin $u^{12}$ to the metal rod $u^7$, from thence by wire 64 to magnet $u^5$, and back, as before, by wires 62 and 63 to the binding-post 56. The armature $u^6$ and rod $u^7$ will thus be held up by the magnet, and the loose dog $t^4$ will be locked by pin $u^{12}$ until the armature $t$ is released. The tooth $t^4$ then drops back into segment $s^7$ without having advanced it one step, the circuit through the magnet $u^5$ is broken, and the locking-rod $u^7$ with its connected parts will be returned to the normal by the coiled spring $u^8$. By this means the selective switch mechanism will be actuated by the long and short impulses of the same strength of current coming over the line in the manner previously described to engage any predetermined one of the contact-pins 38.

As already stated, the series of magnets $a$ for operating the type-bars and escapement mechanism of the type-writer, together with the special magnets O and $p^6$, are electrically divided into four sets, as indicated at 1, 2, 3, and 4 in Fig. 13. In the present construction I provide forty-six magnets $a$, corresponding to the various characters to be printed, which together with the special magnets O and $p^6$ make forty-eight in all, though it is of course obvious that a greater or less number of signals and operating-magnets may be employed. All of the magnets $a$ in set 1 (in the present arrangement they are fifteen in number) are connected by short leads 65 to the return-wire 1'. Special magnet O is also connected by the conductor 66 to the return-wire 1' and is thereby included in set 1 of the series of magnets. All of the magnets $a$ in sets 2, 3, and 4 are similarly connected by short leads 65 to the return-wires 2', 3', and 4', respectively. In the present arrangement I have shown fifteen magnets $a$ in set 2 and eight each in sets 3 and 4. Special magnet $p^6$ is connected by the wire 32 to the return-wire 2' and is thereby included in set 2. The opposite terminals of the series of magnets $a$ are connected by conductors 67 with the sets of binding-posts 1'', 2'', 3'', and 4''. The opposite terminal of the special magnet O is connected by a conductor 68 with one of the binding-posts 1'', and the opposite terminal of the magnet $p^6$ is connected by a wire 31 with one of the binding-posts 2'''. These binding-posts $1''$, $2''$, $3''$, and $4''$ are located in the wall of the magnet-box A, as indicated in Fig. 1. The return-wires $1'$, $2'$, $3'$, and $4'$ are connected to the binding-posts $1'''$, $2'''$, $3'''$, and $4'''$ on the switchboard R, and the series of binding-posts $1''$, $2''$, $3''$, and $4''$ are connected by a series of conductors 69 to a series of binding-posts 70, one for each of the several actuating-magnets, placed upon the switchboard R.

As already stated, the pins 38 are divided into groups of contacts corresponding with a number of the combinations of dots and dashes by which the switch $s$ may be brought into contact with the individual pins. These contacts are connected by a series of conductors 71 with the series of binding-posts 70 in such a manner that each contact of a single group will be connected to a magnet in a separate one of the four sets. The operating-magnets are thus not only divided into sets, but also into groups, in which the individual magnets of each group are located in different sets. For example, the switch $s$ may be moved from the home position into contact with the pin $38^a$ (see Fig. 12) by at least four different combinations of dots and dashes, and the contacts of this pin are connected to a group of four magnets, one of which is in each of the sets 1, 2, 3, and 4, which magnets severally correspond to the four combinations of dots and dashes. When the switch is in contact with the pin $38^a$, the actuating branch of the local circuit will be closed at this point through the group of magnets, and the current may be traced from binding-post 55 by wires 58 and 59 to the universal linkage S and switch $s$, from thence by contact-pin $38^a$ and conductors 71 to binding-post 70, by conductors 69 to one binding-post in each of the sets $1''$, $2''$, $3''$, and $4''$, and from thence by conductors 67 to one of the magnets $a$ in each of the sets 1, 2, 3, and 4, from thence back by the return-wires $1'$, $2'$, $3'$, and $4'$ to the binding-posts $1'''$, $2'''$, $3'''$, and $4'''$ on the switchboard R. It then becomes necessary to close the circuit through one of the magnets of the group in correspondence with the particular combination of dots and dashes used to move the switch $s$ to the contact-pin $38^a$. The operation of the supplemental selective switch mechanism is as follows: I divide the combinations of signals into four sets: first, one or more dots followed by one or more dashes; second, one or more dashes followed by one or more dots; third, one or more dashes followed by one or more dots and one or more dashes, and, fourth, a dot followed by one or more dashes and one or more dots. The various magnets corresponding to the different signal combinations divided into sets and groups in the manner hereinbefore described are properly connected to the contacts of the pins 38 in keeping with this arbitrary classification of the various signals. It is obvious that any other arbitrary division of the signals may be substituted for the one employed, the object being to employ the shorter signals for the most frequently used characters.

The spring-switches 40, 41, 42, and 43 are controlled by the operation of the dot-magnet T, since, as previously stated, the pivot-pin 44 on the end of link $s^2$ normally holds spring 42 into engagement with the spring 40, but at the first dot or short impulse over the line the link $s^2$ is spaced forward one step, releasing the spring 42, which presses upwardly into engagement with the spring 41 and breaking contact with spring 40. At the second short impulse or dot received over the line the link $s^2$ will be spaced forward and the pin 44 will pass over and momentarily contact with the spring-switch 43. The springs 40 and 41 are respectively connected by wires 72 and 73 with one of the terminals of the magnets Y and Y', and the spring 42 is connected to the frame of the armature U by the wires 74 and 60. The contact-spring 43 is connected by a conductor 75 with the contact-pin 54, and the spring-switch 53, normally out of contact with pin 54, is connected by a wire 76 to one of the terminals of the armature $Y^2$. The opposite terminals of all of the magnets Y, Y', and $Y^2$ are connected by branch wires 77, 78, and 79 to a conductor 80, leading to the return-wire 63, connected to binding-post 56. The branch of the local circuit extending between binding-posts 55 and 56 is controlled through the magnets Y, Y', and $Y^2$ by means of these connections, the spring-switches 40, 41, 42, and 43, and the armature $u$ of the magnet U.

The binding-posts $1'''$, $2'''$, $3'''$, and $4'''$ at the ends of the return-wires $1'$, $2'$, $3'$, and $4'$ from the different sets of operating-magnets are respectively connected by the wires 81, 82, 83, and 84 with the contact-pins 51, 49, 48, and 50, located, as indicated, one either side of the armatures $y'$ and $y^2$. These armatures or switches are respectively connected by the short wires 85 and 86 with the contact-pins 46 and 47 on the opposite sides of the armature $y$. The latter is connected by conductor 87 to the frame of magnet W, the armature $w$ of which is connected by a conductor 88 to one of the terminals of the magnet Z, through which the circuit passes by wire 89 back to the binding-post 57. The actuating or printing branch of the local circuit, extending between the binding-posts 55 and 57, is controlled by the combined operation of the switch S, as previously described, and that of the armature-switches $y$, $y'$, and $y^2$.

With the first set of signals, in which one or more dots are followed by one or more dashes, the first short impulse will break the contact between the spring-switches 40 and 42, and the circuit through the magnet Y will thus be broken at this point. At the second short impulse or dot the pin 44 will engage and pass over the spring-switch 43, but the magnet $Y^2$ will not be operated, since the circuit thereto from the spring-switch 43 will be broken between the pin 54 and spring 53. Thus in the first set of signal combinations, which consists solely of one or more dots followed by one or more dashes, the armatures $y$ and $y^2$ will remain in their normal position in contact, respectively, with the pins 47 and 51. The return of the current from the printing mechanism may then be traced as follows, it being remembered that at the end of the completed signal the armature $w$ is released into contact with the pin $w^3$ from wire 1' to the binding-post 1''', wire 81 to contact-pin 51, wire 86 to contact-pin 47, armature $y$ to wire 87, to the frame of magnet W, armature $w$, wire 88, through magnet Z, and back by wire 89 to the binding-post 57, and the circuit through each of the return-wires 2', 3', and 4' from the sets of magnets 2, 3, and 4 back to the binding-post 57 will be broken. In the operation of the signals of this first set it is true that the magnet $y'$ will be actuated by the first long or dash impulse; but this will not effect the return of the current through the armatures $y$ and $y^2$. With the second set of signal combinations, in which one or more dashes are followed by one or more dots, at the first long impulse armature $u$ will be drawn up by magnet U, and the switch 42 will remain in contact with the switch 40. The branch of the local circuit through magnet Y may be traced as follows: from binding-post 55 by wires 58 and 59 to switch mechanism S, through segment $s^3$, shifter $u^2$, armature $u$, and contact-spring $u^{10}$ to the contact-pin $u^{11}$, through the frame of magnet U by wires 60 and 74 to switch 42, by switch 40 and wire 72 through the magnet Y and back by wires 77, 80, and 63 to the binding-post 56. The armature $y$ will thus be drawn up into contact with the pin 46 and locked in such position by its spring $y^3$. With this set of combinations it is obvious that the circuit will not be closed through the magnets Y' and Y². The return of the current may thus be traced by wire 2' to the binding-post 2''', wire 82 to the pin 49, armature $y'$ and wire 85 to the pin 46, armature $y$ and wire 87 through the frame of magnet W, and through the magnet Z back to the binding-post 57, while the circuit through return-wires 1', 3', and 4' remains broken. With the third set of signal-combinations, in which one or more dashes are followed by one or more dots and one or more dashes, at the first long impulse the magnet Y will be operated and its armature $y$ drawn up and locked into engagement with the contact-pin 46 in the manner previously described. At the following short or dot impulse the contact between switches 40 and 42 will be broken and that between switches 41 and 42 will be closed. At the next subsequent dash-impulse a branch of the local circuit may then be traced from the frame of the magnet U by wires 60 and 74 to spring 42, contact-spring 41 and wire 73 to the magnet Y', and by return-wires 78, 80, and 63 back to the binding-post 56. The armature $y'$ will then be drawn up and locked into engagement with the contact-pin 48, and the return-current may be traced by wire 3' to binding-post 3''', by wire 83 to contact-pin 48, by armature $y'$ and wire 85 to the contact-pin 46, by the armature $y$ and wire 87 through the frame of armature $w$ and magnet Z back to the binding-post 57, while the return through wires 1', 2', and 4' is broken. With the fourth set of signal-combinations, in which a single dot is followed by one or more dashes and one or more dots, at the first short or dot impulse the spring-contact 42 will engage the spring-contact 41 and the circuit broken through the magnet Y, its armature $y$ thus remaining in its normal position. At the long or dash impulse immediately following the branch of the local circuit will be closed through the magnet Y' and its armature drawn up in the manner previously described, thus bringing the spring-contact 53 into engagement with the contact-pin 54. At the next subsequent short or dot impulse the pin 44 passes over and momentarily engages with the spring-switch 43. At this time the branch of the local circuit is closed through the magnet Y² as follows: from binding-post 55 by wires 58 and 59 to switch mechanism S, by pin 44, spring-contact 43, and wire 75 to contact-pin 54, by spring-contact 53 and wire 76 through the magnet Y², and back by wires 79, 80, and 63 to the binding-post 56. The armature $y^2$ will thus be drawn up into engagement with the contact-pin 50 and locked in such position by its spring $y^3$. The return-current may then be traced through wire 4 to binding-post 4''', by wire 84 to contact-pin 50, by armature $y^2$, wire 86, to contact-pin 47, and by armature $y$ and wire 87 through the frame of magnet W and through magnet Z back to the binding-post 57, while the return through wires 1', 2', and 3' is broken. In this manner it is obvious that the local operating-circuit will be closed by the selective switch $s$ through a group of magnets in correspondence to the number of separate dots and dashes in the signal received. Each one of the group of magnets, as previously stated, is located in a different set, and, as above described, the local circuit will be closed by the supplemental switch mechanism through the separate sets in correspondence to the order or sequence of the dots and dashes in the signal received. In this way signals may be rapidly transmitted over the line and the actuating-magnet of each signal as it is received selected in turn, thus printing the corresponding characters upon the paper of the receiving instrument. At the same time the branch of the local circuit is closed through any particular magnet and its corresponding type-bar actuated to print the character. It is also closed, as already noted, through the magnet Z, thus drawing up its armature $z$ and rotating ratchet-wheel $z^6$ and commutator $z^8$ through a single space or interval. By this means the entire local battery 51 will be closed through the magnet X for an appreciable interval of time. The current may be traced as follows: from the battery 51 by wire 52 to the binding-post 55, from thence by wires 58 and 90 through the magnet X, by wire 91 to the binding-post 92, by wire 93 to the spring contact or switch $z^9$, thence through the commutator and the frame of the magnet Z and by wire 94 back to the local battery 51. In this way the armature $x$ and rocking arm $x'$ will be actuated to return the universal-switch mechanism S to the normal through the medium of shifting rod $x^2$ and the return to armatures $y$, $y'$, and $y^2$ to the normal through the medium of the connections $x^7$ and springs $x^8$ in the manner already described. The receiving-switch mechanism is thus immediately put into condition to suitably receive and record the next succeeding signal.

It will be understood that whenever the transmitting-operator desires to operate either the carriage-return or the line-space he will transmit a special signal over the line, which will serve to actuate the selective and supplemental switch mechanisms to close the local circuit through the special magnets O and $p^6$, which will then operate these parts in the manner already described. The spring-contacts 34 upon the frame of the instrument are connected to the local battery by the wires 37, as indicated in diagrammatic Figs. 12 and 13, and the local circuit is thus automatically closed through the magnet $p^6$ to operate the line-space whenever the paper-carriage returns to the normal to commence a line of print in the manner already described. The spring-contacts 23 and 24 are connected, respectively, to the wire 68 and to the binding-post 55 of the switchboard, so that whenever the carriage has advanced to the extreme right it will be automatically returned in the manner already described, since the current will be closed through the magnet O from binding-post 55, wire 30, through the magnet to wire 68 and back to the switchboard by the return-wire 1', which in the normal position of the switch mechanism is connected, as already stated, to the binding-post 57.

It is obvious that certain features of the invention may be used without its adoption in entirety. For example, the selective mechanism may be used to operate signals of various kinds, selective telephone-switches, or other similar devices.

It is obvious that my improved apparatus could be operated by any arrangement of relays instead of being directly connected to the line-circuit and that it could be employed with any system of duplex and quadruplex telegraphy. It is also obvious that numerous changes could be effected by those skilled in the art without departure from the essentials of the invention.

Having thus described my invention, what I claim as new, and desire to secure by Letters Patent, is—

1. In electric selective apparatus, the combination with separate electrical devices relatively quick and slow acting to respond differently to variably-timed current impulses of a signal-code, of means controlled by the combined operation of said devices to make the signal.

2. In electric selective apparatus, the combination with separate electrical devices relatively quick and slow acting to respond differently to variably-timed current impulses of signal-code combinations, of selector mechanism arranged to be variably actuated by said devices into position to make the signal corresponding to the combination of impulses received.

3. In electric selective systems, the combination with a line-circuit, of transmitting apparatus arranged to impart combinations of current impulses of different predetermined lengths to said line-circuit in keeping with a signal-code, and receiving apparatus controlled by said line-circuit and comprising separate electrical devices relatively quick and slow acting to respond differently to the variably-timed current impulses and means actuated by said devices to make the signal.

4. In electric selective apparatus, the combination of separate electrical devices, each arranged to be traversed by electrical signal-code impulses of different lengths but of like intensity, said electrical devices being relatively quick and slow acting to respond differently to the variably-timed current impulses of the signal-code and selector mechanism controlled by the combined operation of said devices to make the signal.

5. In electric selective apparatus, the combination with separate electrical devices relatively quick and slow acting to respond differently to variably-timed current impulses of a dot-and-dash code, of selector-switch mechanism controlled by the combined operation of said devices to make the signal.

6. In electric selective apparatus, the combination with separate electromagnets, relatively quick and slow acting to respond differently to the variably-timed current impulses of a signal-code, of selector-switch mechanism arranged to be variably actuated by the combined operation of said electromagnets to make the signal.

7. In electric selective systems, the combination with a line-circuit, of transmitting apparatus arranged to impart to said circuit combinations of differently-timed impulses in keeping with the dot-and-dash code, and receiving apparatus comprising separate electromagnets arranged to be controlled by said line-circuit, said magnets being of relatively different resistances to respond differently to the variably-timed impulses of the code and mechanism actuated by the combined operation of said electromagnets to make the signal.

8. In telegraph systems, the combination with the line-circuit, of transmitting apparatus comprising a plurality of character-keys each arranged to transmit a combination of differently-timed impulses to said line-circuit in keeping with a suitable code and receiving apparatus comprising separate electromagnets controlled by said line-circuit, said electromagnets being constructed to respond differently to said variably-timed impulses and switch mechanism controlled by the combined operation of said electromagnets to make the signal.

9. In telegraph systems, the combination with the line-circuit, of transmitting apparatus arranged to impart to said line-circuit combinations of long and short electrical impulses of like intensity in keeping with a dot-and-dash signal-code and receiving apparatus comprising a pair of electromagnets relatively quick and slow acting to respond differently to said long and short impulses and selective switch mechanism arranged to be variably actuated by the combined operation of said electromagnets into position to make the signal.

10. In telegraphs, the combination with separate electromagnets, quick and slow acting, to respectively correspond to the dot-and-dash signals, of a signal-maker, shifters operated by each of said electromagnets for moving said signal-maker in directions at angles to each other to any one of a number of positions to make the signal.

11. In telegraphs, the combination with separate electromagnets, quick and slow acting to respectively correspond to the dot-and-dash signals, of a switch, a series of contacts in the same plane and shifters operated by each of said electromagnets for moving said switch in different directions parallel to the plane of said contacts to any one of a number of positions to engage said contacts.

12. The combination with separate electrical devices relatively quick and slow acting to respond differently to variably-timed current impulses of a signal-code, of means whereby upon the actuation of said slow-acting device said quick-acting device is in effect rendered inoperative and selecting means controlled by the combined operation of said devices to make the signal.

13. The combination with separate electromagnets, quick and slow acting, to correspond to the short and long electric impulses of a dot-and-dash signal-code, respectively, of signal-making means, shifters for said means operated by each of said electromagnets and means coacting with said slow-acting magnet when the latter is operated to prevent the operation of the shifter of the quick-acting electromagnet.

14. The combination with separate electromagnets in the same circuit, of switch mechanism, shifters therefor operated by the armatures of each of said magnets, and a lock operated by one of said magnets for preventing the operation of the shifter of the other of said magnets.

15. The combination with separate electromagnets in the same circuit, quick and slow acting to correspond respectively to the short and long electrical impulses of a dot-and-dash signal-code, of switch mechanism, shifters therefor operated by the armatures of each of said magnets, a lock for the shifter of said quick-acting magnet, an operating electromagnet for said lock, the circuit of which is controlled by said slow-acting magnet.

16. The combination with separate electromagnets in the same circuit, quick and slow acting to correspond to the dot-and-dash signals, of switch mechanism, shifters therefor operated by the armatures of each of said magnets, a lock controlled by the armature of said slow-acting magnet to prevent the operation of said quick-acting shifter, and means for holding said lock in operative position until the armature of said quick-acting magnet is released.

17. The combination with separate electromagnets in the same circuit, quick and slow acting to correspond to the dot-and-dash signals, of switch mechanism, shifters therefor operated by the armatures of each of said magnets, a lock for the shifter of said quick-acting magnet, an operated electromagnet for said lock, the circuit of which is controlled by the armature of said slow-acting magnet, and means for maintaining the circuit through said lock-magnet until the armature of said quick-acting magnet is released.

18. In telegraphs, the combination with separate electromagnets located in the same circuit and with a universally-mounted mechanism, of shifters operatively connected to the armature of said electromagnets and operated thereby to move said signal-making mechanism in different directions at angles to one another to any one of a number of positions to make the signal.

19. In telegraphs, the combination with separate electromagnets located in and operated by the same circuit, with a local circuit having a number of contacts located in the same plane, and with a universally-mounted switch, of shifters operatively connected to the armatures of said electromagnets to move said switch in different directions parallel to the plane of said contacts to any one of a number of positions to engage said contacts.

20. The combination with the separate electromagnets, relatively quick and slow acting, to respond differently to the short and long electric impulses of a dot-and-dash signal-code, of a universal mechanism coacting with each of said electromagnets to make the signal.

21. The combination with signal-making means and with an operating-electromagnet therefor, of a step-by-step feed for said means comprising ratchet-teeth fixed thereto and a shifter operated by said magnet having a fixed detaining-dog and a pivoted spacing-dog engaging said ratchet-teeth, and light and heavy springs arranged to engage opposite faces of said spacing-dog.

22. The combination with spring-pressed signal-making switch mechanism and with an operating-magnet therefor, of a step-by-step release-feed for said switch mechanism comprising ratchet-teeth fixed thereto, a shifter operated by said magnet having a fixed detaining-dog and a pivoted spring-actuated spacing-dog engaging said ratchet-teeth, and means for returning said switch mechanism to normal position against the tension of its spring.

23. The combination with spring-pressed signal-making means and with separate electromagnets, of release-feed for said signal-making means comprising ratchet-teeth fixed thereto, shifters, operated by each of said magnets having fixed detaining-dogs and pivoted spring-pressed spacing-dogs engaging said ratchet-teeth, and means for returning said switch mechanism to normal position against the tension of its spring.

24. The combination with a universally-mounted spring-pressed signal-making mechanism and with separate electromagnets, of release-feed for said mechanism comprising ratchet-teeth fixed thereto, shifters operated by each of said electromagnets having fixed detaining-dogs and pivoted spring-pressed spacing-dogs engaging said ratchet-teeth, whereby said mechanism may be stepped in different directions at angles to each other, and means for returning said switch mechanism to normal position against the tension of its spring.

25. The combination with signal-making mechanism and with separate electromagnets, of actuating devices for said mechanism comprising ratchet-teeth fixed thereto and shifters operated by each of said magnets having fixed detaining-dogs and pivoted spring-pressed spacing-dogs engaging said ratchet-teeth, and means controlled by the operation of one of said magnets for locking the spacing-dog of the shifter operated by the other of said magnets.

26. The combination with the line-circuit and with means for imparting thereto combinations of electrical impulses, of electrical devices controlled by said circuit, a series of signal-making devices, an operating-circuit therefor, switch mechanism actuated by said electrical devices for closing said operating-circuit through any one of said signal-making devices and a further electrical device controlled by the combinations of impulses in said line-circuit and arranged to prevent the completion of said operating-circuit except at the pauses between completed code combinations.

27. The combination with the line-circuit and with means for imparting thereto combinations of variably-timed electrical impulses in keeping with a dot-and-dash code, of separate electrical devices controlled by said circuit and relatively quick and slow acting to respond differently to said variably-timed impulses, a series of signal-making devices, an operating-circuit therefor, switch mechanism controlled by the combined operation of said electrical devices and arranged to close said operating-circuit through any one of said signal-making devices and a further electrical device controlled by the combinations of impulses on said line-circuit and arranged to prevent the completion of said operating-circuit except at the pauses between the completed code combinations.

28. In telegraphs, the combination with an operating-circuit having a series of contacts, of a signal-maker coöperating with said contacts to close said circuit and to make the signal, electromagnets controlled by a common line-circuit and operated by separate electrical impulses of a signal-code for actuating said signal-maker and an additional magnet controlled by said common line-circuit arranged to prevent the completion of said operating-circuit until the various line impulses forming the completed signal have been received.

29. In telegraphs, the combination with separate electromagnets, relatively quick and slow acting, to respond differently to the dot-and-dash signals, of mechanism controlled by the combined operation of said electromagnets to make the signal, and means for returning said mechanism to the normal after the signal has been made.

30. In telegraphs, the combination with an operating-circuit and with a switch mechanism movable from normal position to close said circuit and make the signal at the end of its traverse, of a movable arm for returning said switch mechanism to normal after the signal has been made, an operating-magnet for said arm and a circuit-closer controlled by said operating-circuit and arranged to complete the circuit through said magnet for an appreciable interval of time.

31. In telegraphs, the combination with an operating-circuit and with a switch mechanism movable from normal position to close said circuit and make the signal at the end of its traverse, of a movable arm for returning said switch mechanism to normal after the signal has been made, an operating-magnet for said arm, a commutator for closing the circuit through said magnet, and actuating means for said commutator operated by a second magnet included in said operating-circuit.

32. In telegraphs, the combination with separate electrical devices, relatively quick and slow acting, to respond differently to the short and long electrical impulses of a dot-and-dash signal-code, of a printing device controlled by the combined operation of said devices for printing the characters corresponding to the signals.

33. In telegraphs, the combination with separate electromagnets, relatively quick and slow acting, to respond differently to the dot-and-dash signals, with a printing device and with an electrical circuit for operating said printing device, of a switch mechanism controlled by the combined operation of said electromagnets to close said circuit, whereby the printing device is operated to print the character corresponding to the signal.

34. In telegraphs, the combination with separate electromagnets, with a printing device, and with an electrical circuit having a series of terminals, of switch mechanism controlled by the combined operation of said magnets to close said circuit through any one of said terminals, whereby said printing device is operated to print the character corresponding to the signal, and means controlled by said operating-circuit for returning said switch mechanism to the normal after the character has been printed.

35. In telegraphs, the combination with a type-writer, with the set of electromagnets, the armatures of which are operatively connected to the type-bars of said type-writer, and with a local circuit for energizing said magnets, of separate electromagnets located in the same circuit, and a switch mechanism coacting with each of said last-mentioned electromagnets to close said local circuit through any one of the electromagnets therein at the end of its traverse, whereby the corresponding type-bar is operated.

36. The combination with the series of signal-making devices divided into "sets" and "groups," the individual members of each "group" being located in different "sets," of means for selecting any particular "group," and supplemental means for selecting a particular "set."

37. In telegraphs, the combination with a series of signal-making devices divided electrically into "sets" and "groups," the individual members of each "group" being located in different "sets," and with an operating-circuit for said signal-making devices, of switch mechanism for closing said circuit through any particular "group," and supplemental switch mechanism for closing the circuit through any particular "set," whereby the signal-making device corresponding to the signal received may be operated.

38. In telegraphs, the combination with a series of signal-making devices divided electrically into "sets" and "groups," the individual members of each "group" being located in different "sets," and with an operating-circuit for said signal-making devices, of switch mechanism for closing said circuit through any particular "group," operating-magnets for said switch mechanism, and supplemental switch mechanism controlled by the operation of said magnets for closing the circuit through any particular "set."

39. In telegraphs, the combination with a series of signal-making devices divided electrically into "sets" and "groups," the individual members of each "group" being located in different "sets," and with an operating-circuit for said signal-making devices having contacts corresponding to said "sets" and "groups," of separate electromagnets operated by the long and short impulses of a dot-and-dash code, switch mechanism actuated by said magnets and coöperating with the "group-contacts" to close said operating-circuit through any particular "group" in correspondence to the number of impulses in the signal received, and supplemental switch mechanism controlled by the operation of said magnets and coöperating with the "set-contacts" for closing said operating-circuit through any particular "set" in correspondence to the order of the impulses in the signal received.

40. In telegraphs, the combination with a series of signal-making devices divided electrically into "sets" and "groups," the individual members of each "group" being located in different "sets," and with an operating-circuit for said signal-making devices, of switch mechanism for closing the circuit through any particular "group," supplemental switch mechanism for closing the circuit through any particular "set," separate actuating-magnets, quick and slow acting, to correspond respectively to the short and long impulses of a dot-and-dash signal-code for operating switch mechanism, and supplemental magnets for actuating said supplemental switch mechanism, the circuit through said supplemental magnets being controlled by the operation of said actuating-magnets.

41. In telegraphs, the combination with a series of signal-making devices divided electrically into "sets" and "groups," the individual members of each "group" being located in different "sets," and with an operating-circuit for said signal-making devices having contacts corresponding to said "groups" and "sets," said group-contacts being located in the same plane, of universally-mounted switch mechanism movable in different directions for engaging any one of said "group-contacts" to close said operating-circuit through any particular "group," a number of supplemental switches coöperating with the "set-contacts" for closing said operating-circuit through any particular "set," separate electromagnets operating in response to the short and long impulses of a dot-and-dash signal-code for actuating said switch mechanism, and a number of supplemental magnets for actuating said supplemental switches, the energizing-circuit through said supplemental magnets being controlled by the operation of said first-mentioned magnets.

42. In printing-telegraphs, the combination with a series of type-bars and with a series of operating-magnets therefor, divided electrically into "sets" and "groups," the individual magnets of each "group" being located in different "sets," of an operating-circuit for said electromagnets, switch mechanism for closing said operating-circuit through any particular "group," and supplemental switch mechanism for closing said operating-circuit through any particular "set," whereby the character corresponding to the signal received may be printed.

43. In a combined automatic transmitting and receiving apparatus, the combination with a series of contact-surfaces corresponding to the "dots" and "dashes" of a signal-code, and with transmitter-switches coöperating therewith, of a series of type-bars, means for actuating said type-bars in response to the short and long electrical impulses of the dot-and-dash signal-code, and a series of finger-keys for controlling the operation of said transmitter-switches and of said type-bars.

44. In a combined automatic transmitting and receiving apparatus, the combination with a series of contact-surfaces corresponding to the "dots" and "dashes" of a signal-code, and with transmitter-switches coöperating therewith, of a series of type-bars, a series of magnets for actuating said type-bars, selective-switch mechanism for closing the circuit through any one of said magnets, operating-magnets responding to the short and long electrical impulses of the dot-and-dash signal-code for actuating said selective-switch mechanism, and a series of finger-keys for controlling the operation of said transmitter-switches and said type-bars.

45. In a combined automatic transmitting and receiving apparatus, the combination with a rotatable contact-cylinder and with a series of transmitter-switches coöperating therewith, of a series of type-bars, a series of magnets for operating said type-bars, selective-switch mechanism for closing the circuit through any one of said magnets, and a series of finger-keys operatively connected to said type-bars and to said transmitter-switches.

46. In a combined automatic transmitting and receiving apparatus, the combination with a series of movable contact-surfaces and with transmitter-switches coöperating therewith, of printing mechanism, a reciprocating paper-carriage therefor, mechanism for returning said carriage to its starting-point, and a motor arranged to be operatively connected either to said carriage-return mechanism or to said movable contact-surfaces.

47. In a combined automatic transmitting and receiving apparatus, the combination with a rotatable contact-cylinder and with a series of transmitter-switches coöperating therewith, of printing mechanism, a reciprocating paper-carriage therefor, a train of gears for returning said paper-carriage to its starting-point, a train of gears for rotating said contact-cylinder, and a motor movably mounted and arranged to be coupled with either of said gear-trains.

48. In a combined automatic transmitting and receiving apparatus for telegraphs, the combination with a series of contact-surfaces, and with transmitting-switches coöperating therewith, of a series of type-bars, selective-switch mechanism for controlling the operation of said type-bars, operating-magnets for said switch mechanism, and means for closing the line-circut through said operating-magnets or through said contacts and transmitter-switches.

49. In telegraphs, the combination with a universally-mounted signal-making mechanism comprising a four-bar linkage mounted intermediate a pair of fixed pivots, the adjacent members of which linkage are arranged substantially at right angles to each other, of means for moving said mechanism in directions at angles to one another to any one of a number of positions to make the signal.

50. In telegraphs, the combination with a universally-mounted signal-making mechanism comprising a four-bar linkage mounted intermediate a pair of fixed pivots, the adjacent members of which linkage are arranged at substantially right angles to each other, of separate electromagnets, and shifters operated by each of said magnets for moving said mechanism in different directions at angles to one another to any one of a number of positions to make the signal.

ALFRED C. GILMORE.

Witnesses:
ROSCOE L. WICKES,
HARRY L. CLAPP.